United States Patent
Patel et al.

(10) Patent No.: US 10,917,878 B2
(45) Date of Patent: Feb. 9, 2021

(54) TECHNIQUES FOR ACKNOWLEDGING SCHEDULING REQUEST TRANSMISSIONS ON A CONTENTION-BASED PHYSICAL UPLINK SHARED CHANNEL

(71) Applicant: QUALCOMM Incorporated, San Diego, CA (US)

(72) Inventors: Shimman Arvind Patel, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 15/362,350

(22) Filed: Nov. 28, 2016

(65) Prior Publication Data

US 2017/0265181 A1 Sep. 14, 2017

Related U.S. Application Data

(60) Provisional application No. 62/307,234, filed on Mar. 11, 2016.

(51) Int. Cl.
*H04W 72/04* (2009.01)
*H04W 74/08* (2009.01)
(Continued)

(52) U.S. Cl.
CPC ... *H04W 72/0413* (2013.01); *H04W 72/0446* (2013.01); *H04W 72/1284* (2013.01); *H04W 74/08* (2013.01); *H04W 74/004* (2013.01)

(58) Field of Classification Search
CPC ......... H04W 72/0413; H04W 72/0446; H04W 72/04; H04W 72/14; H04W 72/1268;
(Continued)

(56) References Cited

U.S. PATENT DOCUMENTS 6,226,280 B1 * 5/2001 Roark ................. H04W 72/044
370/330
9,872,258 B1 * 1/2018 Mansour ............. H04W 52/343
(Continued)

OTHER PUBLICATIONS

ISA/EP, International Search Report and Written Opinion of the International Searching Authority, Int'l Application No. PCT/US2017/013299, dated May 3, 2017, European Patent Office, Rijswijk, NL, 15 pgs.
(Continued)

*Primary Examiner* — Hoang-Chuong Q Vu
(74) *Attorney, Agent, or Firm* — Holland & Hart LLP

(57) ABSTRACT

A method for wireless communication at a user equipment (UE) includes transmitting a scheduling request (SR) transmission in a radio frequency spectrum band on at least one resource of a contention-based physical uplink shared channel (PUSCH), and monitoring the radio frequency spectrum band for a response to the SR transmission. A method for wireless communication at a network access device includes receiving, from a UE, a SR transmission in a radio frequency spectrum band on at least one resource of a contention-based PUSCH; determining an availability of uplink resources allocable to the UE; selecting, based at least in part on the determined availability of uplink resources, the response to the SR transmission; and transmitting in the radio frequency spectrum band, to the UE, the selected response to the SR transmission. The response to the SR transmission includes an uplink grant or an acknowledgement of the SR transmission.

29 Claims, 15 Drawing Sheets

(51) Int. Cl.
  *H04W 72/12*   (2009.01)
  *H04W 74/00*   (2009.01)

(58) Field of Classification Search
  CPC ......... H04W 72/1284; H04W 72/1289; H04W 74/08; H04W 74/00; H04W 74/004
  See application file for complete search history.

(56) References Cited

U.S. PATENT DOCUMENTS

| | | | | |
|---|---|---|---|---|
| 2005/0243761 | A1* | 11/2005 | Terry | H04W 28/06 370/328 |
| 2006/0282519 | A1* | 12/2006 | Trevathan | G06F 9/5072 709/223 |
| 2013/0003678 | A1* | 1/2013 | Quan | H04W 72/04 370/329 |
| 2013/0163535 | A1* | 6/2013 | Anderson | H04W 72/04 370/329 |
| 2013/0163536 | A1* | 6/2013 | Anderson | H04W 72/1284 370/329 |
| 2013/0170444 | A1* | 7/2013 | Pani | H04W 72/0413 370/329 |
| 2014/0204800 | A1* | 7/2014 | Moulsley | H04L 5/0023 370/254 |
| 2015/0341950 | A1* | 11/2015 | Pang | H04W 72/1263 370/329 |
| 2017/0033908 | A1* | 2/2017 | Hwang | H04L 5/00 |
| 2017/0150424 | A1* | 5/2017 | Lee | H04W 48/12 |
| 2017/0201306 | A1* | 7/2017 | Shimezawa | H04B 7/0626 |
| 2017/0208621 | A1* | 7/2017 | Dutta | H04L 5/0055 |
| 2017/0251492 | A1* | 8/2017 | Andersson | H04W 72/1289 |
| 2018/0014323 | A1* | 1/2018 | Huang | H04L 5/001 |
| 2018/0098337 | A1* | 4/2018 | Lee | H04W 72/1205 |
| 2018/0152939 | A1* | 5/2018 | Lee | H04W 72/0413 |
| 2018/0227958 | A1* | 8/2018 | Xiong | H04W 72/0406 |
| 2018/0352565 | A1* | 12/2018 | Feng | H04W 72/04 |

OTHER PUBLICATIONS

Lin, et al., "Uplink Contention Based Multiple Access for 5G Cellular IoT," 82nd Vehicular Technology Conference (VTC2015-FALL), Sep. 6, 2015, pp. 1-5, XP032857340, Institute of Electrical and Electronics Engineers.

* cited by examiner

TECHNIQUES FOR ACKNOWLEDGING SCHEDULING REQUEST TRANSMISSIONS ON A CONTENTION-BASED PHYSICAL UPLINK SHARED CHANNEL

CROSS REFERENCES

The present Application for Patent claims priority to U.S. Provisional Patent Application No. 62/307,234, entitled "Techniques For Acknowledging Scheduling Request Transmissions On A Contention-Based Physical Uplink Shared Channel," filed Mar. 11, 2016, assigned to the assignee hereof.

BACKGROUND

Field of the Disclosure

The present disclosure, for example, relates to wireless communication systems, and more particularly to techniques for acknowledging scheduling request (SR) transmissions on a contention-based physical uplink shared channel (PUSCH).

Description of Related Art

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use orthogonal frequency division multiple access (OFDMA) on the downlink (DL), single-carrier frequency division multiple access (SC-FDMA) on the uplink (UL), and multiple-input multiple-output (MIMO) antenna technology.

By way of example, a wireless multiple-access communication system may include a number of base stations or other nodes, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

In some cases, base stations and UEs may communicate using a dual transmission time interval (TTI) transmission structure. The dual TTI transmission structure may include a legacy TTI transmission structure, such as a subframe-level TTI transmission structure, and a low latency TTI transmission structure (e.g., an ultra low latency (ULL) transmission structure), such as a symbol-level TTI transmission structure.

SUMMARY

The present disclosure, for example, relates to acknowledging scheduling request (SR) transmissions on a contention-based PUSCH, such as a contention-based low latency PUSCH. A UE may transmit a SR transmission on a contention-based PUSCH without first receiving an uplink grant, and thus, the transmission of a SR on a contention-based PUSCH may enable faster uplink access than a transmission of a scheduling request on a legacy PUSCH. The availability of a contention-based PUSCH for the transmission of SRs can also enable the multiplexing of a greater number of users (e.g., UEs). However, when multiple UEs are able to transmit SRs on the same contention-based resources, collisions can occur. Transmission of acknowledgements in response to received SRs (e.g., by a network access device) may therefore be useful to indicate to UEs that their SR transmissions have been received and do not need to be retransmitted.

A method for wireless communication at a UE is described. The method may include transmitting a first SR transmission in a radio frequency spectrum band on at least one resource of a contention-based PUSCH, and monitoring the radio frequency spectrum band for a response to the first SR transmission. The response may include an uplink grant or an acknowledgement of the first SR transmission.

An apparatus for wireless communication at a UE is described. The apparatus may include means for transmitting a first SR transmission in a radio frequency spectrum band on at least one resource of a contention-based PUSCH, and means for monitoring the radio frequency spectrum band for a response to the first SR transmission. The response may include an uplink grant or an acknowledgement of the first SR transmission.

Another apparatus for wireless communication at a UE is described. The apparatus may include a processor, memory in electronic communication with the processor, and instructions stored in the memory. The instructions may be operable, when executed by the processor, to cause the apparatus to transmit a first SR transmission in a radio frequency spectrum band on at least one resource of a contention-based PUSCH, and monitor the radio frequency spectrum band for a response to the first SR transmission. The response may include an uplink grant or an acknowledgement of the first SR transmission.

A non-transitory computer-readable medium storing code for wireless communication at a UE is described. The code may include instructions executable to transmit a first SR transmission in a radio frequency spectrum band on at least one resource of a contention-based PUSCH, and monitor the radio frequency spectrum band for a response to the first SR transmission. The response may include an uplink grant or an acknowledgement of the first SR transmission.

Some examples of the method, apparatuses, or non-transitory computer-readable medium may include operations, features, means, or instructions for randomly selecting the at least one resource of the contention-based PUSCH, and randomly selecting a cyclic shift. The first SR transmission may use the randomly selected cyclic shift.

Some examples of the method, apparatuses, or non-transitory computer-readable medium may include operations, features, means, or instructions for receiving the acknowledgement of the first SR transmission. Some examples may further include operations, features, means, or instructions for determining that the uplink grant is not received within a timeout period of receiving the acknowledgement of the first SR transmission, and transmitting a second SR transmission on at least one subsequent resource of the contention-based PUSCH based at least in part on the determination.

In some examples of the method, apparatuses, or non-transitory computer-readable medium, the monitoring may include operations, features, means, or instructions for monitoring a physical hybrid automatic repeat request indicator channel (PHICH) for the acknowledgement of the first SR transmission. In some examples the monitoring may include monitoring a resource of the PHICH according to a resource mapping relative to the at least one resource of the contention-based PUSCH. Some examples may include operations, features, means, or instructions for selecting a first TTI for transmitting the first SR transmission based at least in part on a relationship of the first TTI to a second TTI in which the PHICH to be monitored is scheduled. In some examples the first SR transmission may be transmitted during a first TTI, and the monitoring may include monitoring the PHICH during a second TTI occurring at least a predetermined time after the first TTI.

Some examples of the method, apparatuses, or non-transitory computer-readable medium may include operations, features, means, or instructions for receiving an indication of a subset of resources of the contention-based PUSCH available to the UE, and selecting, from the subset of resources of the contention-based PUSCH, the at least one resource of the contention-based PUSCH used to transmit the first SR transmission.

In some examples of the method, apparatuses, or non-transitory computer-readable medium, the monitoring may include operations, features, means, or instructions for monitoring a physical downlink control channel (PDCCH) for a group acknowledgement indicating the acknowledgement of the first SR transmission.

Some examples of the method, apparatuses, or non-transitory computer-readable medium may include operations, features, means, or instructions for receiving an indication of a subset of resources of the contention-based PUSCH associated with a measured signal characteristic of the UE, and selecting, from the subset of resources of the contention-based PUSCH, the at least one resource of the contention-based PUSCH used to transmit the first SR transmission.

In some examples of the method, apparatuses, or non-transitory computer-readable medium, the acknowledgement of the first SR transmission may be received according to a transmit power matched to the measured signal characteristic associated with the UE.

Some examples of the method, apparatuses, or non-transitory computer-readable medium may include operations, features, means, or instructions for receiving an indication of a subset of resources of a PUSCH allocated to the contention-based PUSCH, and selecting, from the subset of resources, the at least one resource of the contention-based PUSCH used to transmit the first SR transmission.

Some examples of the method, apparatuses, or non-transitory computer-readable medium may include operations, features, means, or instructions for determining that neither the uplink grant nor the acknowledgement of the first SR transmission is received within a response period following transmission of the SR transmission, and transmitting a second SR transmission on the contention-based PUSCH based at least in part on the determination.

Some examples of the method, apparatuses, or non-transitory computer-readable medium may include operations, features, means, or instructions for generating a random backoff time period, and the second SR transmission may be transmitted after expiration of the random backoff time period.

A method for wireless communication at a network access device is described. The method may include receiving, from a UE, a SR transmission in a radio frequency spectrum band on at least one resource of a contention-based PUSCH, and determining an availability of uplink resources allocable to the UE. The method may further include selecting, based at least in part on the determined availability of uplink resources allocable to the UE, a response to the SR transmission, and transmitting, to the UE in the radio frequency spectrum band, the selected response to the SR transmission. The selected response to the SR transmission may include an uplink grant or an acknowledgement of the SR transmission.

An apparatus for wireless communication at a network access device is described. The apparatus may include means for receiving, from a UE, a SR transmission in a radio frequency spectrum band on at least one resource of a contention-based PUSCH, means for determining an availability of uplink resources allocable to the UE, means for selecting, based at least in part on the determined availability of uplink resources allocable to the UE, a response to the SR transmission, and means for transmitting, to the UE in the radio frequency spectrum band, the selected response to the SR transmission. The selected response to the SR transmission may include an uplink grant or an acknowledgement of the SR transmission.

Another apparatus for wireless communication at a network access device is described. The apparatus may include a processor, memory in electronic communication with the processor, and instructions stored in the memory. The instructions may be operable, when executed by the processor, to cause the apparatus to receive, from a UE, a SR transmission in a radio frequency spectrum band on at least one resource of a contention-based PUSCH, and determine an availability of uplink resources allocable to the UE. The instructions may be further operable to select, based at least in part on the determined availability of uplink resources allocable to the UE, a response to the SR transmission, and transmit, to the UE in the radio frequency spectrum band, the selected response to the SR transmission. The selected response to the SR transmission may include an uplink grant or an acknowledgement of the SR transmission A non-transitory computer-readable medium storing code for wireless communication at a network access device is described. The code may include instructions executable to receive, from a UE, a SR transmission in a radio frequency spectrum band on at least one resource of a contention-based PUSCH, and determine an availability of uplink resources allocable to the UE. The code may further include instructions executable to select, based at least in part on the determined availability of uplink resources allocable to the UE, a response to the SR transmission, and transmit in the radio frequency spectrum band, to the UE, the selected response to the SR transmission. The selected response to the SR transmission may include an uplink grant or an acknowledgement of the SR transmission.

In some examples of the method, apparatuses, or non-transitory computer-readable medium, the selected response to the SR transmission may include the acknowledgement of the SR transmission. Some examples may include operations, features, means, or instructions for transmitting the acknowledgement of the SR transmission on a PHICH. In some examples the acknowledgement of the SR transmission may be transmitted on a resource of the PHICH having a resource mapping relative to the at least one resource of the contention-based PUSCH. In some examples the acknowledgement of the SR transmission may be transmitted in a group acknowledgement on a PDCCH.

Some examples of the method, apparatuses, or non-transitory computer-readable medium may include operations, features, means, or instructions for transmitting an indication of a subset of resources of a PUSCH that are allocated to the contention-based PUSCH.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for acknowledging scheduling request (SR) transmissions on a contention-based PUSCH (e.g., a contention-based low latency PUSCH, which may be referred to as a contention-based ultra low latency PUSCH (uPUSCH) or a contention-based shortened transmission time interval PUSCH (sPUSCH)). A UE may transmit a SR on a contention-based PUSCH without first receiving an uplink grant so as to enable faster uplink access than a transmission of a SR on a legacy PUSCH. The described techniques enable a UE to transmit a SR transmission in a radio frequency spectrum band on at least one resource of the contention-based PUSCH, and to monitor the radio frequency spectrum band for a response to the SR transmission. A network access device (e.g., a base station) that receives the SR transmission may determine an availability of uplink resources allocable to the UE, and may select a response to the SR transmission based at least in part on the determined availability of uplink resources. The response may include an uplink grant (e.g., when uplink resources are available) or an acknowledgement of the SR transmission (e.g., when uplink resources are not available).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
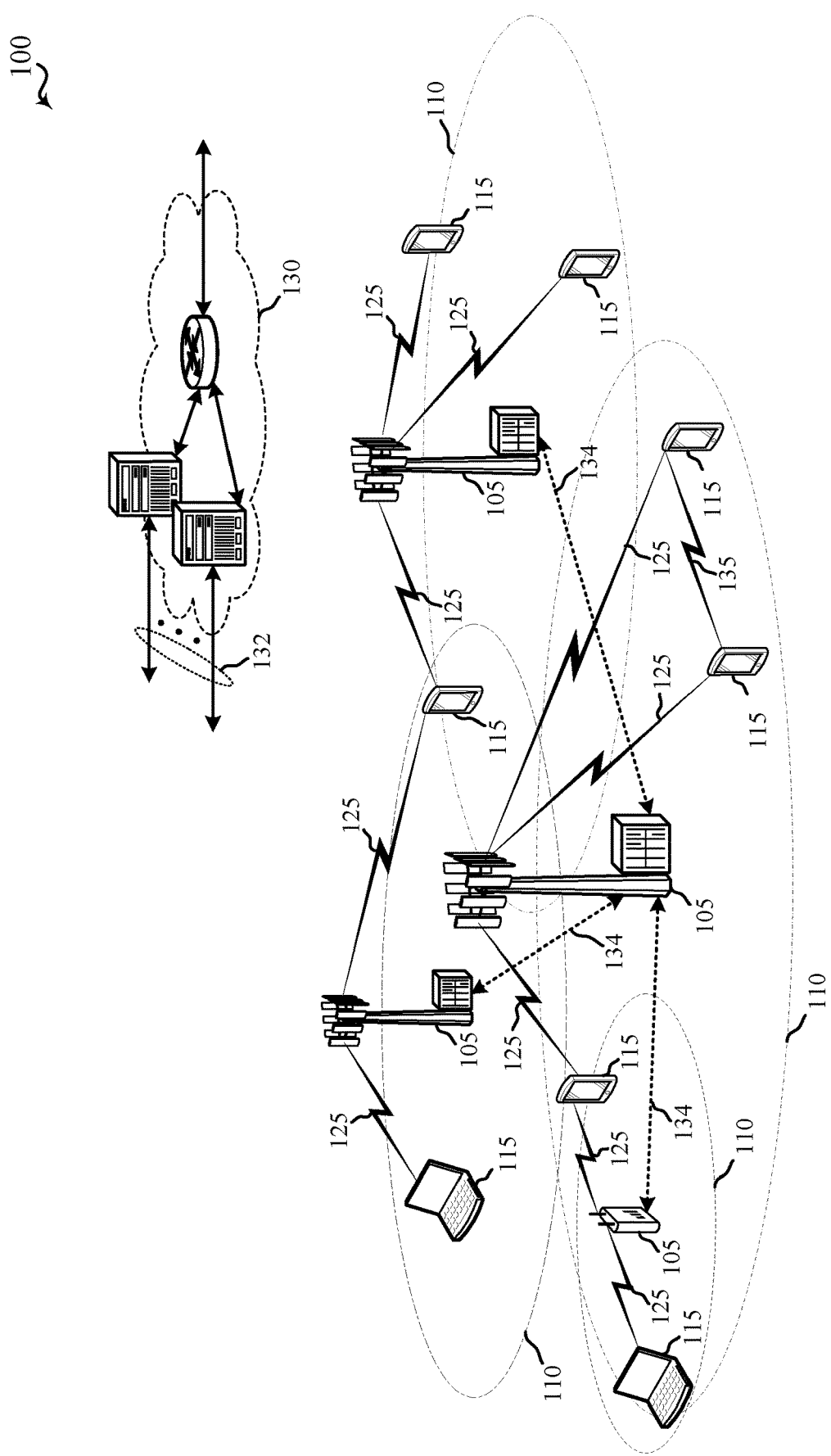
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. The network access devices 105 may interface with the core network 130 through backhaul links 132 (e.g., S1, etc.) and may perform radio configuration and scheduling for communication with the UEs 115, or may operate under the control of a base station controller (not shown). In various examples, the network access devices 105 may communicate, either directly or indirectly (e.g., through core network 130), with each other over backhaul links 134 (e.g., X2, etc.), which may be wired or wireless communication links.

The network access devices 105 may wirelessly communicate with the UEs 115 via at least one network access device antenna. Each of the network access devices 105 may provide communication coverage for a respective geographic coverage area 110. In some examples, a network access device 105 may be referred to as a base station, a base transceiver station, a radio base station, an access point, a radio transceiver, a NodeB, an eNodeB (eNB), a Home NodeB, a Home eNodeB, or some other suitable terminology. The geographic coverage area 110 for a network access device 105 may be divided into sectors making up a portion of the coverage area (not shown). The wireless communication system 100 may include network access devices 105 of different types (e.g., macro or small cell base stations). There may be overlapping geographic coverage areas 110 for different technologies.

In some examples, the wireless communication system 100 may include a Long Term Evolution (LTE) or LTE-Advanced (LTE-A) network. In LTE/LTE-A networks, the term evolved Node B (eNB) may be used to describe the network access devices 105 (or entities including one or more network access devices 105). The wireless communication system 100 may be a Heterogeneous LTE/LTE-A network in which different types of network access devices provide coverage for various geographical regions. For example, each network access device 105 may provide communication coverage for a macro cell, a small cell, or other types of cell. The term "cell" is a 3rd Generation Partnership Project (3GPP) term that can be used to describe a network access device, a carrier or component carrier associated with a network access device, or a coverage area (e.g., sector, etc.) of a carrier or network access device, depending on context.

A macro cell may cover a relatively large geographic area (e.g., several kilometers in radius) and may allow unrestricted access by UEs with service subscriptions with the network provider. A small cell may be a lower-powered network access device, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a Closed Subscriber Group (CSG), UEs for users in the home, and the like). A network access device for a macro cell may be referred to as a macro eNB. A network access device for a small cell may be referred to as a small cell eNB, a pico eNB, a femto eNB or a home eNB. A network access device may support one or multiple (e.g., two, three, four, and the like) cells (e.g., component carriers).

The wireless communication system 100 may support synchronous or asynchronous operation. For synchronous operation, the network access devices may have similar frame timing, and transmissions from different network access devices may be approximately aligned in time. For asynchronous operation, the network access devices may have different frame timing, and transmissions from different network access devices may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of a RRC connection between a UE 115 and the network access devices 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, an Internet of things (IoT) device, an Internet of Everything (IoE) device, a machine type communication (MTC) device, an appliance, an automobile, etc. A UE 115 may be able to communicate with various types of network access devices and network equipment, including macro eNBs, small cell eNBs, relay base stations, and the like. A UE may also be able to communicate using different radio access technologies (RATs), such as a cellular RAT (e.g., an LTE/LTE-A RAT), a Wi-Fi RAT, or other RATs.

The communication links 125 shown in wireless communication system 100 may include downlinks from a network access device 105 to a UE 115, or uplinks from a UE 115 to a network access device 105. The downlinks may also be called forward links, while the uplinks may also be called reverse links. Wireless communication system 100 may also support communication between UEs 115, such as device-to-device (D2D) communications via a D2D communication link 135.

In some examples, each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, network access devices 105 or UEs 115 may include multiple antennas for employing antenna diversity schemes to improve communication quality and reliability between network access devices 105 and UEs 115. Additionally or alternatively, network access devices 105 or UEs 115 may employ multiple-input, multiple-output (MIMO) techniques that may take advantage of multi-path environments to transmit multiple spatial layers carrying the same or different coded data (e.g., by way of spatial multiplexing).

The wireless communication system 100 may support operation on multiple cells or carriers, a feature which may be referred to as carrier aggregation (CA) or multi-carrier operation. A carrier may also be referred to as a component carrier (CC), a layer, or the like. The terms "carrier," "component carrier," and "cell" may be used interchangeably herein. A UE 115 may be configured with multiple downlink CCs and one or more uplink CCs for carrier aggregation. Carrier aggregation may be used with both FDD and TDD component carriers. In some cases, the wireless communication system 100 may utilize enhanced CCs (eCC). An eCC may be characterized by features, including: flexible bandwidth, transmission time intervals (TTIs) having shorter duration compared to other TTIs (e.g., shorter duration than legacy TTIs), variable durations for various TTIs, and/or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

Some communications of the wireless communication system 100 may be configured according to a frame structure, where a frame may span a 10 ms time duration that may be further divided into 10 equally-sized subframes. Each subframe may include two consecutive time slots, and each time slot may include 6 or 7 OFDMA symbol periods. A resource element (RE) may span a time duration equal to one symbol period, and a portion of a radio frequency spectrum band equal to one subcarrier (e.g., a 15 KHz frequency range). A resource block (RB) may contain 12 consecutive subcarriers in the frequency domain and, for a normal cyclic prefix in each orthogonal frequency division multiplexed (OFDM) symbol, 7 consecutive OFDM symbols in 1 slot (84 resource elements) in the time domain. The number of bits carried by each resource element may depend on the modulation scheme (the configuration of symbols that may be selected during each symbol period).

The wireless communication system 100 may support communications according to one or more TTI transmission structures to organize physical resources (e.g., various portions of a radio frequency spectrum band for various TTI durations), as well as to coordinate uplink and downlink communications and various responsive operations (e.g., acknowledgments). For example, a repetition of physical channel resources may be based on a TTI transmission structure, such that interleaved resource patterns of physical channels may be repeated according to a particular TTI duration. A subframe-level TTI transmission structure, for example, may include an interleaved pattern of one or more physical channels that repeats between certain subframes. A one-slot TTI transmission structure may include an interleaved pattern of one or more physical channels that repeats between certain slots.

In some examples such repetition of physical resources may be combined, such that certain physical channels, or portions thereof, may be repeated according to two or more different TTI durations (e.g., a legacy TTI and a low-latency TTI or shortened TTI (sTTI)). For example, the wireless communication system 100 may be configured to combine a subframe-level TTI transmission structure with a one-slot TTI transmission structure to provide certain legacy capability and/or backward compatibility according to a subframe-level TTI, and also to provide certain low-latency capability according to the one-slot TTI. Other examples may include further combinations of TTI transmission structures, including transmission structures according to more than two TTI durations, and TTI durations different than a subframe-level TTI transmission structure and a slot-level TTI transmission structure. In various examples, aspects of a TTI transmission structure may be configured according to a communication protocol (e.g., a communications standard), semi-statically configured based on a configuration of a device or a configuration determined upon establishment of a communications link, or dynamically configured based on communications to/from a device.

The wireless communication system 100 may, for example, utilize a dual TTI transmission structure that includes a legacy TTI transmission structure (e.g., a subframe-level TTI transmission structure), and a shortened TTI transmission structure (e.g., having TTI duration shorter than the legacy TTI transmission structure). In various examples, a shortened TTI transmission structure may configure TTIs according to a one-symbol TTI duration, a two-symbol TTI duration, or one-slot TTI duration. The wireless communication system 100 may also support standalone low latency (e.g., ULL) operation, or operation with an otherwise shortened TTI duration. Low latency resources may be configured to provide various different physical channels (e.g., low latency physical channels having a resource mapping according to a low-latency TTI), including uplink and downlink shared channels, uplink and downlink control channels, and random access channels. According to aspects of the present disclosure, low latency resources may also be configured for contention-based operations (e.g., a contention-based uPUSCH), where such contention-based resources may not be explicitly assigned to specific devices, and devices may transmit using the contention-based resources without being granted those resources.

Figure 2:
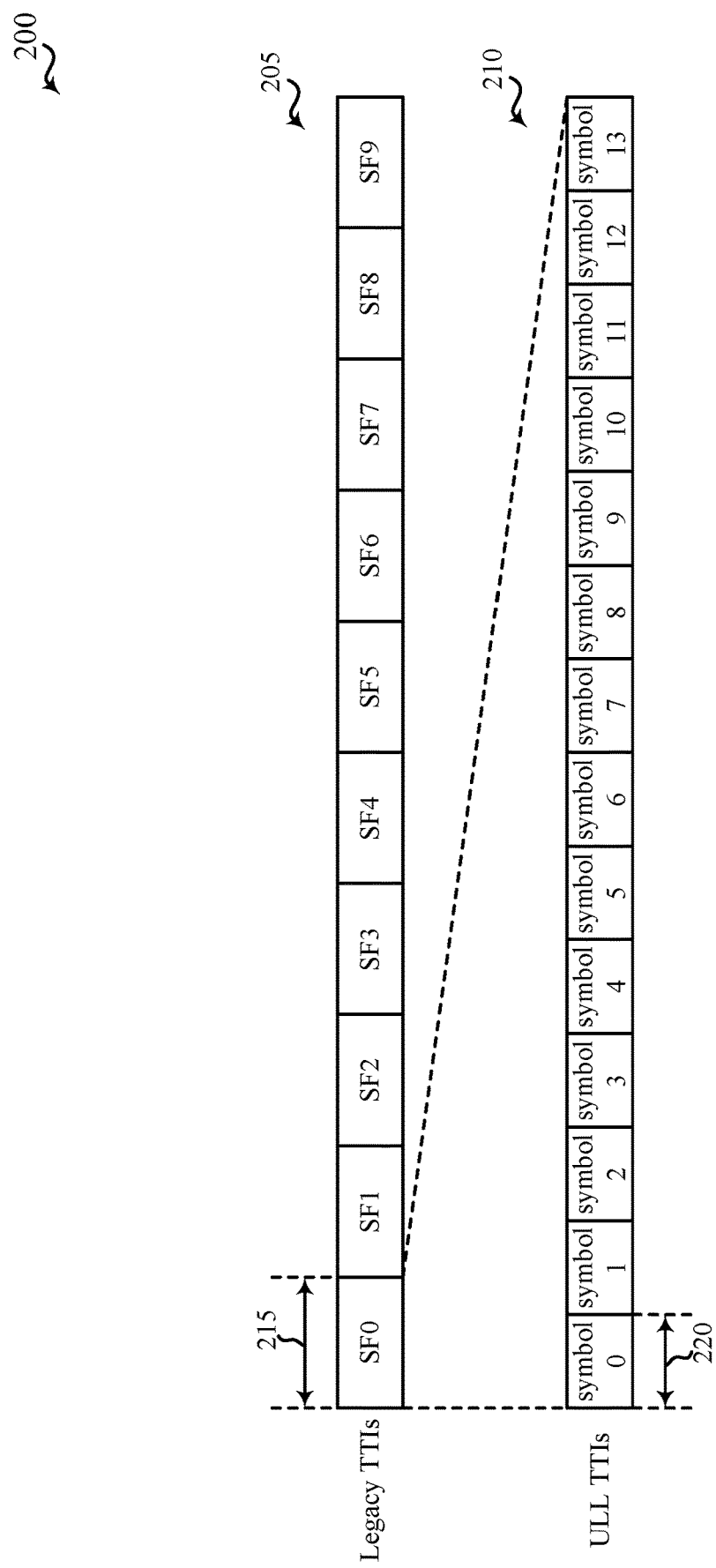
FIG. 2 illustrates a dual TTI transmission structure that supports communication between network access devices and UEs, in accordance with various aspects of the present disclosure.

FIG. 2 illustrates a dual TTI transmission structure 200 that supports communication between network access devices 105 and UEs 115, in accordance with various aspects of the present disclosure. The network access devices 105 and UEs 115 that use the dual TTI transmission structure 200 may be examples of aspects of the network access devices 105 and UEs 115 described with reference to FIG. 1. The dual TTI transmission structure 200 may include a legacy TTI transmission structure 205, which may be an example of a subframe-level TTI transmission structure, and a low latency TTI transmission structure 210, which may be an example of a symbol-level TTI transmission structure (e.g., a ULL TTI transmission structure). By way of example, the low latency TTI transmission structure 210 may have a TTI duration 220 that is 1/14 the duration of a TTI duration 215 of the legacy TTI transmission structure 205. Alternatively, the TTI durations 215 and 220 may have a different ratio.

In some examples, a network access device 105 or a UE 115 may communicate using one or both of the legacy TTI transmission structure 205 or the low latency TTI transmission structure 210. Communications according to the legacy TTI transmission structure 205 and the low latency TTI transmission structure 210 may be transmitted on the same radio frequency spectrum band. Communications according to the low latency TTI transmission structure 210 may be transparent to legacy network access devices and legacy UEs that do not support low latency communication, which may support backwards compatibility.

A network access device 105 or UE 115 may leverage LTE/LTE-A numerology (e.g., timing, TTI structure, etc.) when using a low latency TTI transmission structure to minimize implementation effort and foster backward compatibility. The low latency TTI transmission structure 210 may significantly reduce latency in a wireless communication system when compared with legacy TTI transmission structure 205, because responsive operations and/or transmissions according to the low latency TTI transmission structure 210 may occur more rapidly and/or more frequently than those of the legacy TTI transmission structure 205.

In some examples, a physical uplink shared channel (PUSCH), a physical downlink shared channel (PDSCH), a physical downlink control channel (PDCCH), a physical hybrid automatic repeat request indicator channel (PHICH), or other physical channel may be transmitted using the legacy TTI transmission structure 205. In some examples, one or more low latency physical channels (e.g., a ULL PUSCH (uPUSCH), a ULL PDSCH (uPDSCH), a ULL PDCCH (uPDCCH), a ULL PHICH (uPHICH), a shortened-TTI PUSCH (sPUSCH), a shortened-TTI PDSCH (sPDSCH), a shortened-TTI PDCCH (sPDCCH), a shortened-TTI PHICH (sPHICH), or other channel) may be organized according to the low latency TTI transmission structure 210, and accordingly may include a pattern of resources that is repeated for certain low latency TTIs (e.g., repeated for certain symbols), with the pattern being transmitted within a duration of the low latency TTI.

Figure 3:
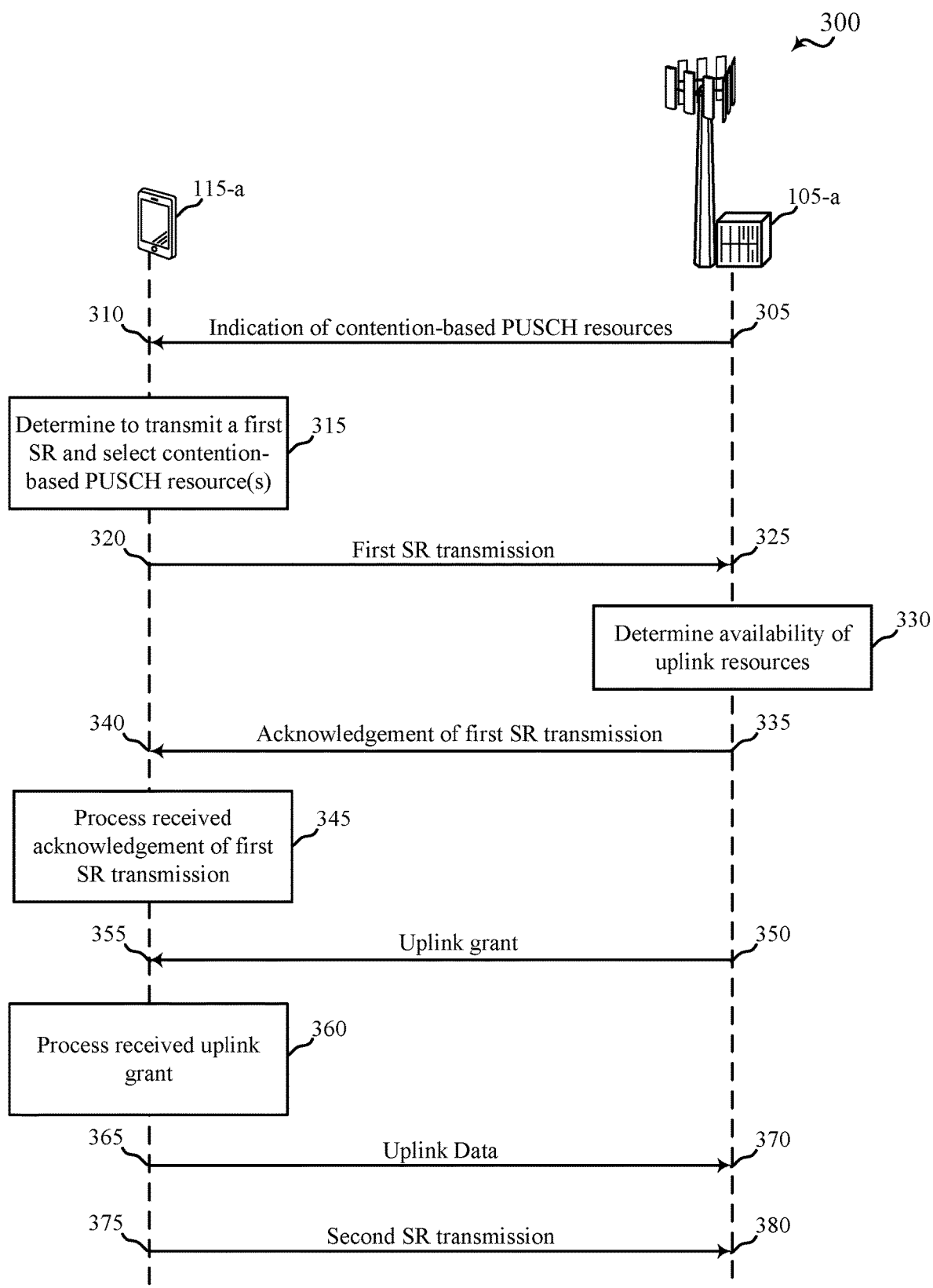
FIG. 3 shows a communication flow in which communication occurs between a network access device and a UE, in accordance with various aspects of the present disclosure.

FIG. 3 shows a communication flow 300 in which communication occurs between a network access device 105-a (e.g., a base station) and a UE 115-a, in accordance with various aspects of the present disclosure. The network access device 105-a may be an example of aspects of the network access devices 105 described with reference to FIG. 1, and the UE 115-a may be an example of aspects of the UEs 115 described with reference to FIG. 1.

At 310, the UE 115-a may receive an indication of contention-based PUSCH resources (e.g., as transmitted by the network access device 105-a at 305). The indicated resources may be a subset of resources of a PUSCH (e.g., a subset of resources of a uPUSCH) allocated to a contention-based PUSCH (e.g., a contention-based uPUSCH).

At 315, the UE 115-a may determine to transmit a first SR, and select contention-based PUSCH resources for transmitting the SR. For example, the UE 115-a may select at least one resource of the contention-based PUSCH resources indicated by the indication received at 310. The selection of resources by the UE 115-a may be a random selection, and in some examples the UE 115-a may also randomly select a cyclic shift for transmitting the first SR.

At 320, the UE 115-a may transmit the first SR transmission in a radio frequency spectrum band on the contention-based PUSCH resources selected at 315 (e.g., as randomly selected). The first SR transmission may be transmitted according to a cyclic shift that was randomly selected at 315. In some examples, the first SR transmission may include a reference signal (e.g., a demodulation reference signal (DMRS)), a user-specific Radio Network Temporary Identifier (RNTI), and/or Buffer Status Report (BSR) information. Following the transmission of the first SR at 320, the UE 115-a may monitor a radio frequency spectrum band during a timed response period for either an acknowledgement of the first SR transmission or an uplink grant.

At 325, the network access device 105-a may receive the first SR transmission from the UE 115-a. For example, the network access device 105-a may be monitoring for SR transmissions on resources of the contention-based PUSCH. In various examples the network access device 105-a may be configured to always monitor for SR transmissions from UEs 115 on the contention-based PUSCH, or may be configured to monitor for SR transmissions on the contention based PUSCH based on prior communications with one or more UEs 115 (e.g., following establishment of a communication link with one or more UEs 115 including the UE 115-a, following an indication of contention-based PUSCH resources at 305, etc.).

At 330, in response to receiving the first SR transmission at 325, the network access device 105-a may determine an availability of uplink resources allocable to the UE 115-a. The network access device 105-a may select a response to the first SR transmission based at least in part on the determined availability of uplink resources. The selected response may include an uplink grant matched to a user-specific RNTI received with the first SR transmission (e.g., when uplink resources allocable to the UE 115-a are available), or an acknowledgement of the first SR transmission (e.g., when uplink resources allocable to the UE 115-a are not available). The network access device 105-a may subsequently transmit the selected response to the UE 115-a.

At 335, for example, when uplink resources allocable to the UE 115-a are not available, the network access device 105-a may transmit an acknowledgement of the first SR transmission in the radio frequency spectrum band.

At 340, the UE 115-a may receive the acknowledgement of the first SR transmission sent by the network access device 105-a at 335. For example, after transmitting the first SR transmission at 320, the UE 115-a may be monitoring the radio frequency spectrum band for a response to the first SR transmission, and at 340 the UE 115-a may receive the acknowledgment of the first SR transmission during the monitoring.

At 345, the UE 115-a may process the acknowledgement of the first SR transmission received at 340. In some examples, processing the received acknowledgement may include starting or continuing the monitoring of the radio frequency spectrum band during a timeout period (e.g., for a subsequent uplink grant). The timeout period may be a time period extending past a time of receipt of the acknowledgement (e.g., a time period beginning upon receipt of the acknowledgement at 340). The duration of the timeout period may differ from the duration of the response period, and the timeout period may expire at a different time than the expiration of the response period.

At 350, when uplink resources allocable to the UE are available, the network access device 105-a may transmit an uplink grant to the UE 115-a in the radio frequency spectrum band. In some examples, such uplink resources may have become available following a transmission of an acknowledgement of a SR transmission (e.g., following the acknowledgement of the first SR transmission transmitted at 335). In other examples, such uplink resources may be available upon receiving a SR transmission from the UE 115-a (e.g., at 325), in which case the network access device 105-a may transmit an uplink grant without having transmitted an acknowledgement of the SR transmission (e.g., omitting the transmission of an acknowledgement of the first SR transmission at 335).

At 355, the UE 115-a may receive the uplink grant transmitted by the network access device 105-a at 350. For example, after transmitting the first SR transmission at 320, and/or after receiving an acknowledgement of the first SR transmission at 340, the UE 115-a may be monitoring the radio frequency spectrum band for a response to the first SR transmission, and may receive the uplink grant during the monitoring. In some examples, the UE 115-a may have begun, or continued such monitoring for the uplink grant after receiving an acknowledgement of a SR transmission at

340. In some examples, the UE 115-*a* may receive the uplink grant within a response period initiated upon transmission of the first SR transmission at 320 and/or within a timeout period initiated upon receiving the acknowledgement of the first SR transmission at 340.

At 360, the UE 115-*a* may process the uplink grant received at 355. For example, the UE 115-*a* may decode the uplink grant, and identify resources for transmitting uplink data to the network access device 105-*a*.

At 365, the UE 115-*a* may transmit uplink data to the network access device 105-*a*, in accordance with the uplink grant processed at 360. At 370, the network access device 105-*a* may receive the uplink data transmitted by the UE 115-*a* at 365.

In some cases, the UE 115-*a* may not receive an acknowledgement of the first SR transmission at 340, or may not receive an uplink grant at 355. Such conditions may arise when the network access device 105-*a* does not receive the first SR transmission at 325 and thus does not transmit the an acknowledgement of the first SR transmission at 335 and/or does not transmit an uplink grant at 350. In some examples an acknowledgement of the first SR transmission transmitted by the network access device at 335 is not received by the UE 115-*a* at 340, or is not properly decoded by the UE 115-*a* at 345. In some examples an uplink grant transmitted by the network access device 105-*a* at 350 is not received by the UE 115-*a* at 355, or is not properly decoded by the UE 115-*a* at 360. Under such circumstances (e.g., when neither an acknowledgement of the first SR transmission nor an uplink grant is received prior to the expiration of response time, or when an uplink grant is not received prior to the expiration of the timeout period), the UE 115-*a* may determine to transmit a second SR transmission.

At 375, following such a determination, the UE 115-*a* may transmit a second SR transmission on the contention-based PUSCH. In some examples, the UE 115-*a* may generate a random backoff time period and transmit the second SR transmission after expiration of the random backoff time period. When transmitting a second SR transmission at 375, any one or more of the operations of 320 through 370 may be repeated for the second SR transmission.

At 380, the network access device 105-*a* may receive the second SR transmission transmitted by the UE 115-*a* at 375, and may select a response to the second SR transmission as previously discussed.

Figure 4:
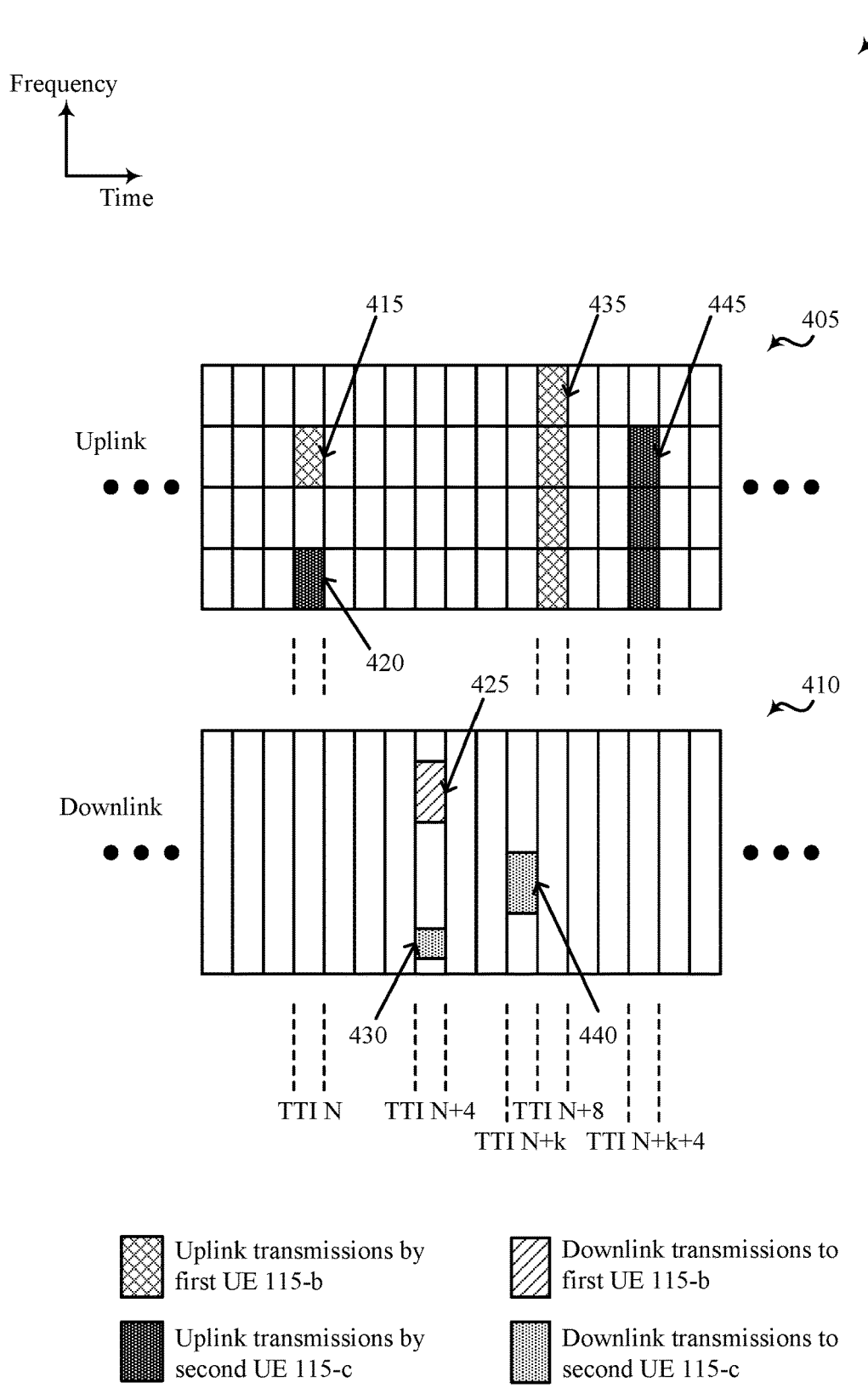
FIG. 4 shows a timeline of communications between a first UE, a second UE, and a network access device, in accordance with various aspects of the present disclosure.

FIG. 4 shows a timeline of communications 400 between a first UE 115-*b*, a second UE 115-*c*, and a network access device 105-*b* (e.g., a base station), in accordance with various aspects of the present disclosure. The first UE 115-*b* and the second UE 115-*c* may be examples of aspects of the UEs 115 described with reference to FIG. 1, 2 or 3, and the network access device 105-*b* may be an example of aspects of the network access devices 105 described with reference to FIG. 1, 2 or 3. The timeline of communications 400 includes a timeline of uplink communications 405 (e.g., communications from the first UE 115-*b* and the second UE 115-*c* to the network access device 105-*b*) and a timeline of downlink communications 410 (e.g., communications from the network access device 105-*b* to the first UE 115-*b* and the second UE 115-*c*). The timeline of communications 400 may be described in accordance with a TTI transmission structure (e.g., according to a certain TTI duration), which in some examples may be a low-latency TTI transmission structure, such as low latency TTI transmission structure 210 described with reference to FIG. 2.

During a TTI N of a contention-based PUSCH (e.g., a contention-based uPUSCH), the first UE 115-*b* may randomly select at least one resource 415 of the contention-based PUSCH, and a cyclic shift, for transmitting a first SR transmission in a radio frequency spectrum band on the at least one resource 415. Similarly, the second UE 115-*c* may randomly select at least one resource 420 of the contention-based PUSCH, and a cyclic shift, for transmitting a first SR transmission in the radio frequency spectrum band on the at least one resource 420. The first SR transmissions from the first UE 115-*b* and the second UE 115-*c* may be received by the network access device 105-*b*, as described, for example, at 325 with reference to FIG. 3.

After transmitting the respective first SR transmissions, the first UE 115-*b* and the second UE 115-*c* may each monitor downlink resources for a respective response to the first SR transmissions. In the example of communications 400, during a TTI N+4 of the downlink resources, the network access device 105-*b* may transmit an uplink grant to the first UE 115-*b* (e.g., in response to the first SR transmission from the first UE 115-*b*), and may transmit an acknowledgement of the first SR transmission to the second UE 115-*c* (e.g., in response to the first SR transmission from the second UE 115-*c*). The uplink grant may be transmitted to the first UE 115-*b* in the radio frequency spectrum band on at least one resource 425, and the acknowledgement of the first SR transmission may be transmitted to the second UE 115-*c* in the radio frequency spectrum band on at least one resource 430.

Following receipt of the uplink grant, the first UE 115-*b* may transmit data to the network access device 105-*b* using at least one resource 435 of a TTI N+8, in accordance with the uplink grant. Following receipt of the acknowledgement of the first SR transmission, the second UE 115-*c* may continue to monitor the downlink for an uplink grant. In some examples, the network access device 105-*b* may transmit an uplink grant to the second UE 115-*c*, during a TTI N+k, before expiration of a timeout period monitored by the second UE 115-*c*, and the second UE 115-*c* may transmit data to the network access device 105-*c* using at least one resource 445 of a TTI N+k+4, in accordance with the uplink grant. The uplink grant may be transmitted in the radio frequency spectrum band on at least one resource 440.

In some examples, each of the first UE 115-*b* and the second UE 115-*c* may transmit data to the network access device 105-*b* on a PUSCH (e.g., the at least one resource 435 and/or the at least one resource 445 may be resources of a uPUSCH).

In the example communication flow 300 described with reference to FIG. 3, and in the timeline of communications 400 described with reference to FIG. 4, the acknowledgements of SR transmissions may be transmitted in various ways. For example, an acknowledgement of a SR transmission may be transmitted on a PHICH (e.g., a uPHICH or a legacy PHICH) or a PDCCH (e.g., a uPDCCH).

When an acknowledgement of a SR transmission on a contention-based PUSCH is transmitted on a uPHICH, the acknowledgment of the SR may be transmitted on resources of the uPHICH with a resource mapping relative to the resources of a contention-based PUSCH used for the SR transmission. For example, an acknowledgment of a SR transmission may be configured in resources of a uPHICH at a fixed number of TTIs after the SR transmission (e.g., 4 symbols after the SR transmission). Accordingly, a UE 115 may be configured to monitor for a response to a transmitted SR transmission in a TTI at the fixed number of TTIs after the transmitted SR transmission.

In some examples, uPHICH acknowledgement resources may be mapped to uPHICH groups and sequences. In some examples, contention-based PUSCH parameters may be mapped to uPHICH parameters on a one-to-one basis. For example, contention-based PUSCH starting RBs and uPUSCH cyclic shifts may be mapped to uPHICH group and sequence numbers defined by functions f and g, where:

uPHICH group n=f(uPUSCH starting RB, uPUSCH cyclic shift); and uPHICH sequence s=g(uPUSCH starting RB, uPUSCH cyclic shift).

To limit uPHICH overhead, a network access device may configure uPHICH resources on a subset of downlink TTIs (e.g., on a subset of periodic downlink TTIs). In such examples, a UE 115 may select a first TTI for transmitting a SR transmission based at least in part on a relationship of the first TTI to a second TTI in which a uPHICH is scheduled (e.g., a TTI in which a uPHICH to be monitored for a response to a SR is scheduled). Alternatively, a UE may transmit a SR transmission during a first TTI, and monitor the uPHICH during a second TTI occurring at least a predetermined time after the first TTI (e.g., after transmission of the first SR transmission). For example, the second TTI may be a next TTI, after the predetermined time, in which uPHICH resources are configured.

Figure 5:
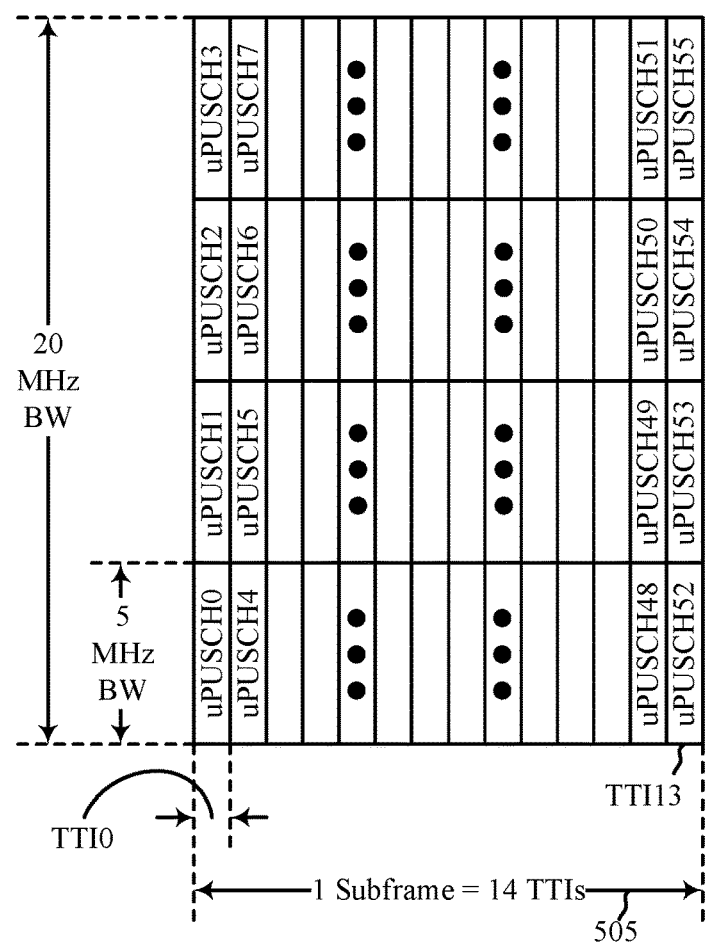
FIG. 5 shows a time and frequency grid of contention-based PUSCH resources, in accordance with various aspects of the present disclosure.

FIG. 5 shows a time and frequency grid 500 of contention-based PUSCH resources, in accordance with various aspects of the present disclosure. In some examples, the contention-based PUSCH may include a contention-based ultra low latency PUSCH (e.g., contention-based uPUSCH). By way of example, the contention-based PUSCH is shown to have a one symbol (e.g., one OFDM symbol) TTI duration, with 14 TTIs being allocated in a subframe 505. Also by way of example, the contention-based PUSCH resources may span a bandwidth (BW) of 20 MHz, with four contention-based PUSCH blocks (e.g., four 5 MHz bandwidth blocks) being allocated per TTI. The contention-based PUSCH blocks are named and numbered uPUSCH0, uPUSCH1, uPUSCH2, and uPUSCH3 in TTI0, with block uPUSCH0 having a lowest frequency bandwidth. The contention-based PUSCH blocks are named and numbered uPUSCH0-uPUSCH55 across TTI0-TTI13 in the subframe 505. The subframe 505 therefore has 56 contention-based PUSCH resource allocations. In alternative examples, the TTIs within a subframe may have a different duration (e.g., two symbols, one slot, etc.) and/or a different number of contention-based PUSCH blocks may be allocated per TTI.

When an acknowledgement of a contention-based PUSCH SR transmission is transmitted on a legacy PHICH, and assuming a n+4 TTI reception time and acknowledgement delay (e.g., according to a TTI transmission structure), SR transmissions transmitted/received in contention-based PUSCH resource allocations uPUSCH40-uPUSCH55 in subframe n and contention-based PUSCH resource allocations uPUSCH0-uPUSCH39 in subframe n+1 may be acknowledged in a legacy PHICH scheduled at the beginning of subframe n+2. In some examples, legacy PHICH acknowledgement resources may be mapped to legacy PHICH groups and sequences (e.g., according to a legacy TTI transmission structure). In some examples, contention-based PUSCH parameters may be mapped to legacy PHICH parameters based on uPUSCH starting RB, uPUSCH cyclic shift, and uPUSCH TTI number (e.g., according to a combination of a legacy TTI transmission structure and a ULL TTI transmission structure). For example, contention-based PUSCH starting RBs, uPUSCH cyclic shifts, and uPUSCH TTI numbers may be mapped to uPHICH group and sequence numbers defined by functions f and g, where:

PHICH group n=f(uPUSCH starting RB, uPUSCH cyclic shift, TTI number); and

PHICH sequence s=g(uPUSCH starting RB, uPUSCH cyclic shift, TTI number).

A potential advantage of acknowledging contention-based PUSCH SR transmissions using legacy PHICH resources instead of uPHICH resources is that existing infrastructure can be used and ultra low latency control resource overhead need not be increased. A potential advantage of acknowledging contention-based PUSCH SR transmissions using uPHICH resources instead of legacy PHICH resources is shorter acknowledgement delay.

In some cases, collisions may occur between contention-based PUSCH users and legacy PUSCH users (e.g., because contention-based PUSCH users do not know a priori the legacy PUSCH parameters needed to avoid collisions). In some examples, a network access device may mitigate such collisions by partitioning legacy PHICH resources between contention-based PUSCH users and legacy PUSCH users. For example, the legacy PUSCH transmission parameter set (e.g., starting RB and cyclic shift) may be constrained depending on the legacy PHICH partition size allocated to legacy PUSCH users.

In some cases, collisions may occur between contention-based PUSCH users (e.g., because network access devices and transmitting UEs do not know a priori the transmitting UE contention-based PUSCH parameters). In some examples, a network access device may mitigate such collisions by partitioning contention-based PUSCH resources between different subsets of contention-based PUSCH users, and indicating to the contention-based PUSCH users the different subsets of contention-based PUSCH resources allocated to the different subsets of contention-based PUSCH users. In some examples, the different subsets of contention-based PUSCH users may include contention-based PUSCH resources associated with different TTIs. In some examples, the different subsets of contention-based PUSCH users may be defined based on past load metrics of contention-based PUSCH users using a legacy PHICH and/or contention-based PUSCH backoff metrics received from UEs.

When it is anticipated that the number of contention-based PUSCH SR transmissions that need to be acknowledged is relatively small, the acknowledgements may be transmitted on a PDCCH (e.g., a uPDCCH). In some examples, the acknowledgements may be transmitted on a uPDCCH in a group acknowledgement. For example, acknowledgements of SR transmissions mapped to a single group and one of eight sequences transmitted on a uPHICH may instead be mapped to one of 8 bits transmitted on a uPDCCH. A 16 bit cyclic redundancy check (CRC) may be transmitted with the 8 bits, such that a total of 24 bits (or 12 resource elements (REs)) may be transmitted on the uPDCCH (similar in size to a single group uPHICH). In some examples, a common group RNTI may be used for the uPDCCH, and a UE may attempt a blind decode of the 8 bits in the uPDCCH. When the UE's RNTI matches the common group RNTI, the UE can identify its acknowledgement feedback. A potential advantage of acknowledging contention-based PUSCH SR transmissions using uPDCCH resources is that a uPDCCH resource need not be reserved for a contention-based PUSCH resource on which no SR transmission is received.

In some examples, the acknowledgement of contention-based PUSCH SR transmissions in a group acknowledgement on a uPDCCH may require power matching transmission of the group acknowledgement for a worst case contention-based PUSCH user. To mitigate power matching requirements, the group acknowledgement may be split into two or more portions (or messages), with one portion being power matched for contention-based PUSCH users at a cell edge, and with another portion being power matched for contention-based PUSCH users receiving cell coverage better than that at the cell edge. In some examples, contention-based PUSCH resources (e.g., starting RBs, cyclic shifts, etc.) may be partitioned into two groups such that the first group maps to a first uPDCCH and the second group maps to a second uPDCCH. In some examples, a UE may identify which of the two groups of contention-based PUSCH resources to use based on a comparison of a measured signal characteristic (e.g., a reference signal received power (RSRP) measurement) to a threshold (e.g., to a RSRP threshold). Alternatively, a network access device may signal to a UE which group of contention-based PUSCH resources the UE should use (which may enable better monitoring of resource group usage). To limit downlink control overhead, control for the two groups may be interlaced on separate TTIs.

In some examples, a subset of resources of a PUSCH (e.g., a uPUSCH) may be allocated for use as a contention-based PUSCH (e.g., a contention-based uPUSCH), thereby dividing the resources of the PUSCH into PUSCH resources and contention-based PUSCH resources. A network access device may indicate (e.g., signal) the subset of resources allocated to the contention-based PUSCH to one or more UEs. In some examples, the subset of resources allocated to the contention-based PUSCH may be indicated by specifying a subset of PUSCH starting RBs, cyclic shifts, and TTI numbers. A network access device may acknowledge SR transmissions received on the subset of resources allocated to the contention-based PUSCH using one or more of the techniques described in the present disclosure, but may acknowledge transmissions received on the non-contention-based PUSCH resources using HARQ procedures.

Figure 6:
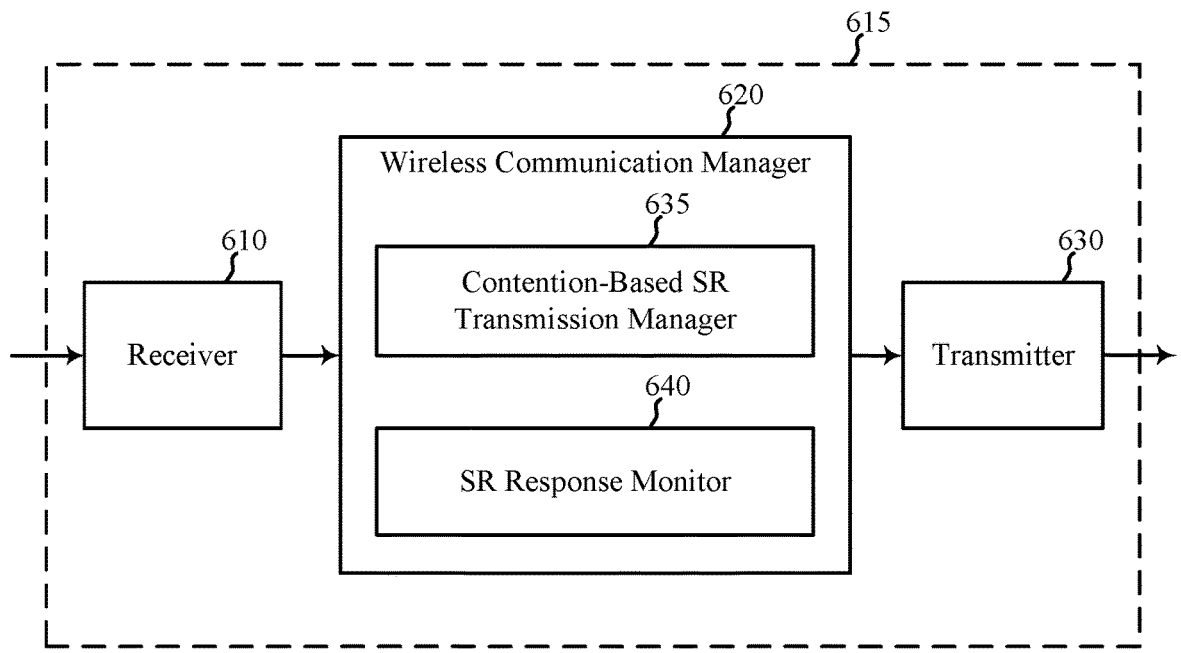
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115 described with reference to FIG. 1 through 5. The apparatus 615 may also be or include a processor. The apparatus 615 may include a receiver 610, a wireless communication manager 620, or a transmitter 630. Each of these components may be in communication with each other.

The components of the apparatus 615 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other integrated circuits may be used (e.g., a Structured/Platform ASIC, a field-programmable gate array (FPGA), a System on Chip (SoC), and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one radio frequency (RF) receiver, such as at least one RF receiver operable to receive transmissions over at least one radio frequency spectrum band. In some examples, one or more of the at least one radio frequency spectrum band may be used for LTE/LTE-A communications, as described, for example, with reference to FIG. 1, 2, 3, 4, or 5. The receiver 610 may be used to receive various data or control signals (i.e., transmissions) over one or more communication links of a wireless communication system, such as one or more communication links of the wireless communication system 100 described with reference to FIG. 1.

In some examples, the transmitter 630 may include at least one RF transmitter, such as at least one RF transmitter operable to transmit over at least one radio frequency spectrum band. The transmitter 630 may be used to transmit various data or control signals (i.e., transmissions) over one or more communication links of a wireless communication system, such as one or more communication links of the wireless communication system 100 described with reference to FIG. 1.

In some examples, the wireless communication manager 620 may be used to manage one or more aspects of wireless communication for the apparatus 615. In some examples, part of the wireless communication manager 620 may be incorporated into or shared with the receiver 610 or the transmitter 630. In some examples, the wireless communication manager 620 may include a contention-based SR transmission manager 635 or a SR response monitor 640.

The contention-based SR transmission manager 635 may be used to transmit (e.g., in cooperation with the transmitter 630) a SR transmission in a radio frequency spectrum band on at least one resource of a contention-based PUSCH (e.g., a contention-based uPUSCH). In some examples, the at least one resource of the contention-based PUSCH may be randomly selected, and a cyclic shift may also be randomly selected. In these examples, the SR transmission may be transmitted in the radio frequency spectrum band, on the randomly selected resource(s) of the contention-based PUSCH, using the randomly selected cyclic shift. In some examples, the SR transmission may include a reference signal, a user-specific RNTI, and/or BSR information.

The SR response monitor 640 may be used to monitor (e.g., in cooperation with the receiver 610) the radio frequency spectrum band for a response to the SR transmission. The response may include an uplink grant or an acknowledgement of the SR transmission.

Figure 7:
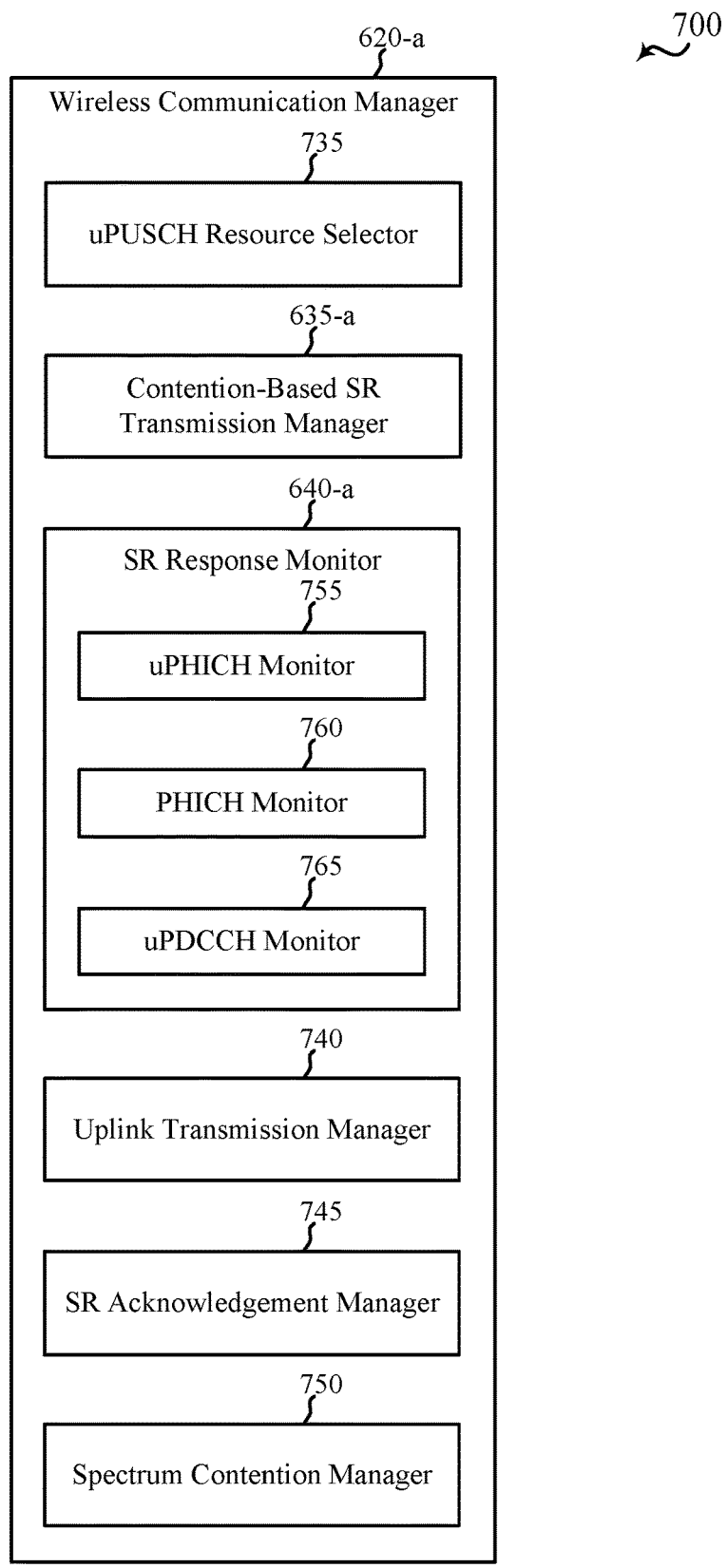
FIG. 7 shows a block diagram of a wireless communication manager for use in wireless communication, in accordance with various aspects of the present disclosure.

FIG. 7 shows a block diagram 700 of a wireless communication manager 620-a for use in wireless communication, in accordance with various aspects of the present disclosure. The wireless communication manager 620-a may be an example of aspects of the wireless communication manager 620 described with reference to FIG. 6.

The components of the wireless communication manager 620-a may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 620-a may be used to manage one or more aspects of wireless communication for a UE or apparatus, such as one of the UEs 115 described with reference to FIG. 1 through 5, or one of the apparatus 615 described with reference to FIG. 6. In some examples, part of the wireless communication manager 620-*a* may be incorporated into or shared with a receiver or a transmitter (e.g., the receiver 610 or the transmitter 630 described with reference to FIG. 6). In some examples, the wireless communication manager 620-*a* may include a uPUSCH resource selector 735, a contention-based SR transmission manager 635-*a*, a SR response monitor 640-*a*, an uplink transmission manager 740, a SR acknowledgement manager 745, or a spectrum contention manager 750.

The contention-based SR transmission manager 635-*a* may be used to transmit (e.g., in cooperation with a transmitter) a first SR transmission in a radio frequency spectrum band on at least one resource of a contention-based PUSCH (e.g., a contention-based uPUSCH). In some examples, the at least one resource of the contention-based PUSCH may be randomly selected by the uPUSCH resource selector 735, and a cyclic shift may also be randomly selected by the uPUSCH resource selector 735. In these examples, the first SR transmission may be transmitted in the radio frequency spectrum band, on the randomly selected resource(s) of the contention-based PUSCH, using the randomly selected cyclic shift. In some examples, the uPUSCH resource selector 735 may receive (e.g., in cooperation with a receiver) an indication of a subset of resources of a PUSCH (e.g., a uPUSCH) allocated to the contention-based PUSCH, and may select, from the subset of resources, the at least one resource of the contention-based PUSCH used to transmit the first SR transmission. In some examples, the first SR transmission may include a reference signal, a user-specific RNTI, and/or BSR information. In some examples, the uPUSCH resource selector 735 may receive an indication of a subset of resources of the contention-based PUSCH available to a UE including the wireless communication manager 620-*a*, and may select, from the subset of resources, the at least one resource of the contention-based PUSCH used to transmit the first SR transmission.

The SR response monitor 640-*a* may be used to monitor (e.g., in cooperation with a receiver) the radio frequency spectrum band for a response to the first SR transmission. The response may include an uplink grant or an acknowledgement of the first SR transmission. When the SR response monitor 640-*a* determines that neither the uplink grant nor the acknowledgement of the first SR transmission is received within a response period following transmission of the first SR transmission, the contention-based SR transmission manager 635-*a* may be used to transmit a second SR transmission on the contention-based PUSCH based at least in part on the determination that neither the uplink grant nor the acknowledgement of the first SR transmission is received within the response period. In some examples, the spectrum contention manager 750 may be used to generate a random backoff time period and transmit the second SR transmission after expiration of the random backoff time period.

In some examples, the SR response monitor 640-*a* may include a uPHICH monitor 755, a PHICH monitor 760, or a uPDCCH monitor 765. The uPHICH monitor 755 may be used to monitor a PHICH (e.g., uPHICH) for the acknowledgement of the first SR transmission. In some examples, monitoring the PHICH may include monitoring a resource of the PHICH having a resource mapping relative to (e.g., a fixed number of TTIs after) the at least one resource of the contention-based PUSCH on which the first SR transmission is transmitted by the contention-based SR transmission manager 635-*a*. In some examples, the uPUSCH resource selector 735 may select a first TTI for transmitting the first SR transmission based at least in part on a relationship of the first TTI to a second TTI in which a transmission of the PHICH is scheduled. In some examples, the first SR transmission may be transmitted during a first TTI, and the uPHICH monitor 755 may monitor the PHICH during a second TTI occurring at least a predetermined time after transmission of the first SR transmission.

The PHICH monitor 760 may be used to monitor a PHICH (e.g., a legacy PHICH) for the acknowledgement of the first SR transmission.

The uPDCCH monitor 765 may be used to monitor a PDCCH (e.g., a uPDCCH) for a group acknowledgement indicating the acknowledgement of the first SR transmission. In some examples, the uPUSCH resource selector 735 may receive an indication of a subset of resources of the contention-based PUSCH associated with a measured signal characteristic of a UE including the wireless communication manager 620-*a*, and may select, from the subset of resources of the contention-based PUSCH, the at least one resource of the contention-based PUSCH used to transmit the first SR transmission. In some examples, the SR acknowledgement manager 745 may receive an acknowledgement of the first SR transmission at a transmit power matched to the measured signal characteristic associated with the UE.

The uplink transmission manager 740 may be used to receive (e.g., in cooperation with a receiver) the uplink grant and transmit data in accordance with the received uplink grant.

The SR acknowledgement manager 745 may be used to receive (e.g., in cooperation with a receiver) an acknowledgement of the first SR transmission. The SR acknowledgement manager 745 may also be used to determine whether an uplink grant is received within a timeout period extending past a time of receipt of the acknowledgment of the first SR transmission. When the SR acknowledgement manager 745 determines the uplink grant is not received within the timeout period, the contention-based SR transmission manager 635-*a* may be used to transmit (e.g., in cooperation with a transmitter) a second SR transmission on the contention-based PUSCH based at least in part on the determination that the uplink grant is not received within the timeout period.

Figure 8:
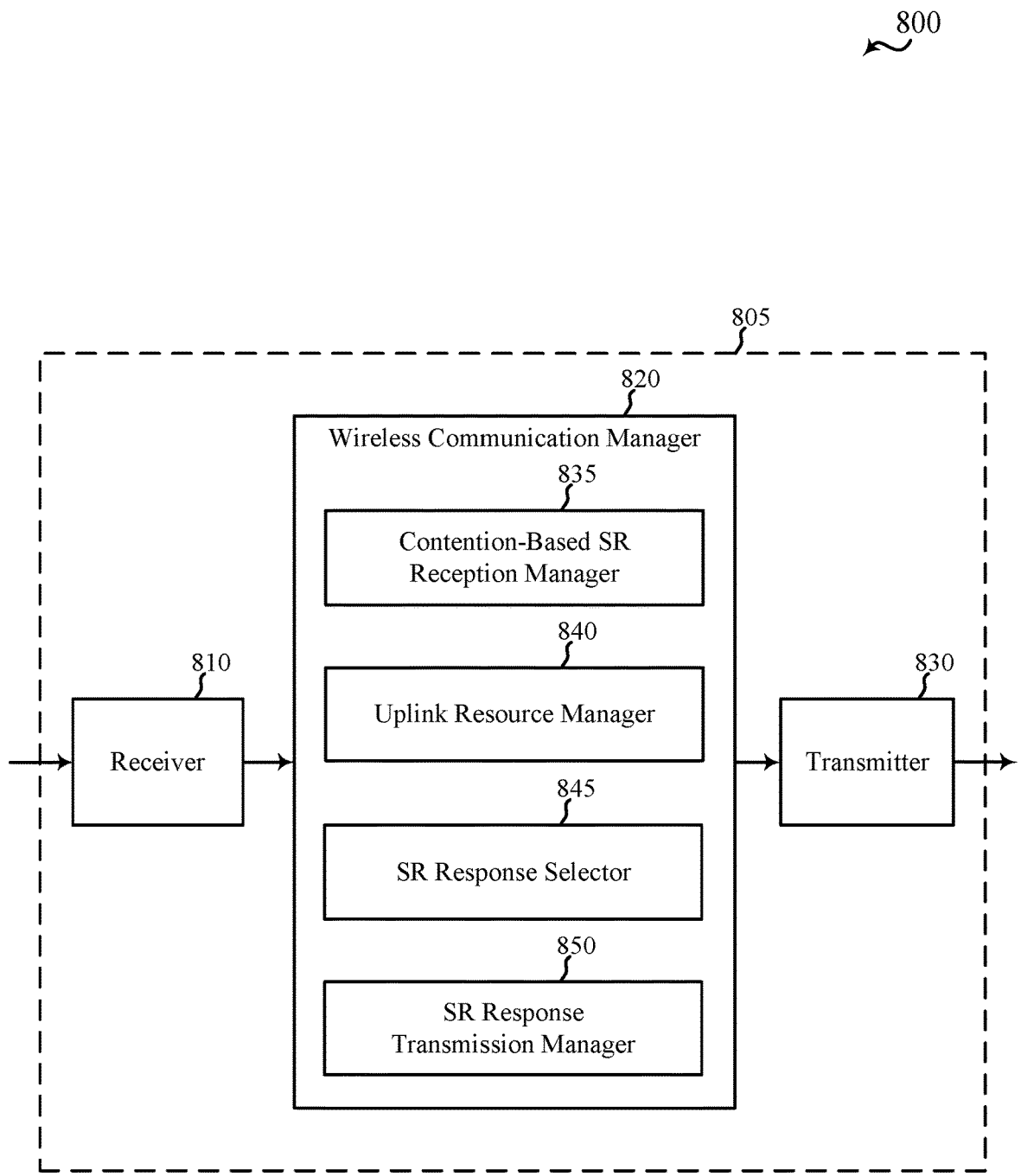
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of a network access device, such as an example of aspects of one or more of the network access devices 105 described with reference to FIG. 1 through 5. The apparatus 805 may also be or include a processor. The apparatus 805 may include a receiver 810, a wireless communication manager 820, or a transmitter 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over at least one radio frequency spectrum band. In some examples, one or more of the at least one radio frequency spectrum band may be used for LTE/LTE-A communications, as described, for example, with reference to FIG. 1, 2, 3, 4, or 5. The receiver 810 may be used to receive various data or control signals (i.e., transmissions) over one or more communication links of a wireless communication system, such as one or more communication links of the wireless communication system 100 described with reference to FIG. 1.

In some examples, the transmitter 830 may include at least one RF transmitter, such as at least one RF transmitter operable to transmit over at least one radio frequency spectrum band. The transmitter 830 may be used to transmit various data or control signals (i.e., transmissions) over one or more communication links of a wireless communication system, such as one or more communication links of the wireless communication system 100 described with reference to FIG. 1.

In some examples, the wireless communication manager 820 may be used to manage one or more aspects of wireless communication for the apparatus 805. In some examples, part of the wireless communication manager 820 may be incorporated into or shared with the receiver 810 or the transmitter 830. In some examples, the wireless communication manager 820 may include a contention-based SR reception manager 835, an uplink resource manager 840, a SR response selector 845, or SR response transmission manager 850.

The contention-based SR reception manager 835 may be used to receive (e.g., in cooperation with the receiver 810), from a UE, a SR transmission. The SR transmission may be received in a radio frequency spectrum band on at least one resource of a contention-based PUSCH (e.g., a contention-based uPUSCH). In some examples, the SR transmission may include a reference signal, a user-specific RNTI, and/or BSR information.

The uplink resource manager 840 may be used to determine an availability of uplink resources allocable to the UE.

The SR response selector 845 may be used to select, based at least in part on the determined availability of uplink resources allocable to the UE, a response to the SR transmission. The selected response to the SR transmission may include an uplink grant or an acknowledgement of the SR transmission.

The SR response transmission manager 850 may be used to transmit (e.g., in cooperation with the transmitter 830) to the UE in the radio frequency spectrum band, the selected response to the SR transmission.

Figure 9:
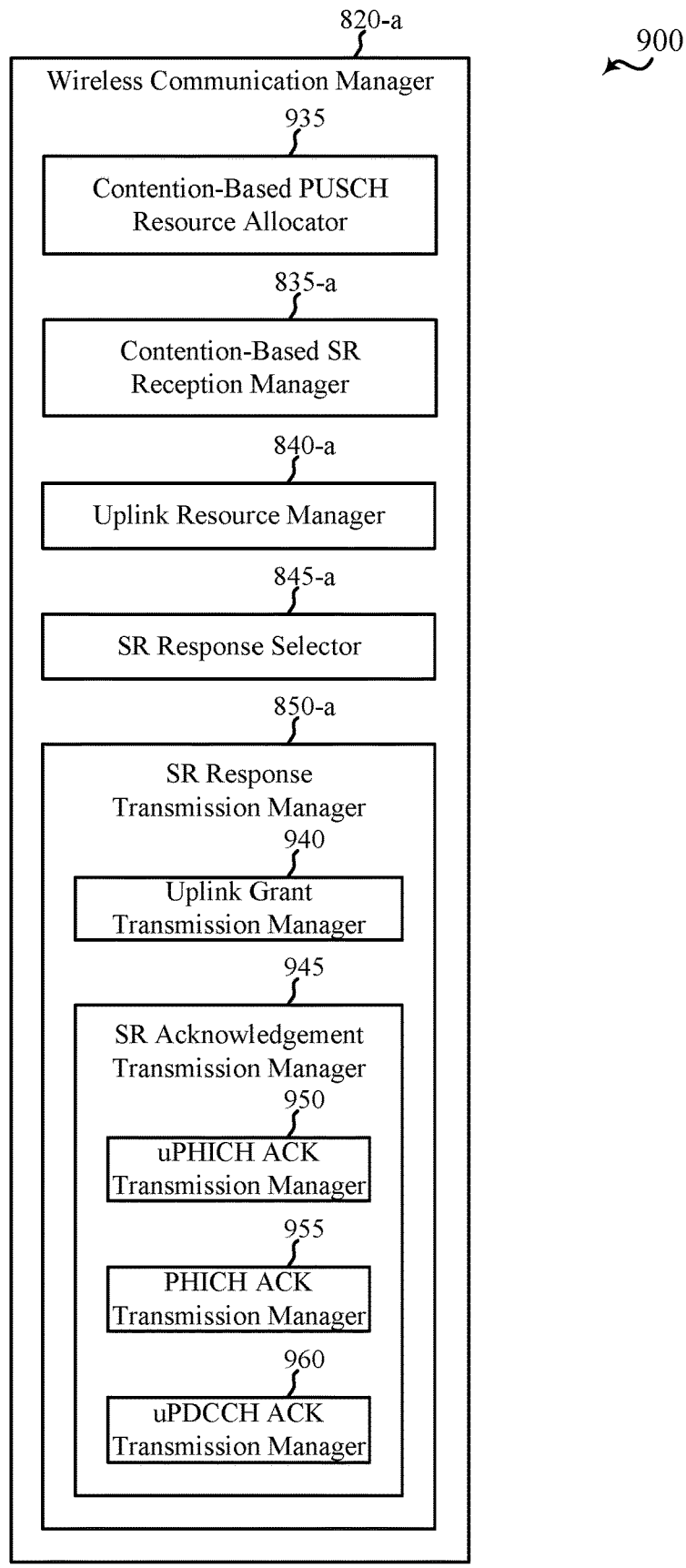
FIG. 9 shows a block diagram of a wireless communication manager for use in wireless communication, in accordance with various aspects of the present disclosure.

FIG. 9 shows a block diagram 900 of a wireless communication manager 820-*a* for use in wireless communication, in accordance with various aspects of the present disclosure. The wireless communication manager 820-*a* may be an example of aspects of the wireless communication manager 820 described with reference to FIG. 8.

The components of the wireless communication manager 820-*a* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 820-*a* may be used to manage one or more aspects of wireless communication for a network access device or apparatus, such as one of the network access devices 105 described with reference to FIG. 1 or 3, or one of the apparatus 805 described with reference to FIG. 8. In some examples, part of the wireless communication manager 820-*a* may be incorporated into or shared with a receiver or a transmitter (e.g., the receiver 810 or the transmitter 830 described with reference to FIG. 8). In some examples, the wireless communication manager 820-*a* may include a contention-based PUSCH resource allocator 935, a contention-based SR reception manager 835-*a*, an uplink resource manager 840-*a*, a SR response selector 845-*a*, or a SR response transmission manager 850-*a*.

The contention-based PUSCH resource allocator 935 may be used to optionally transmit (e.g., in cooperation with a transmitter) an indication of a subset of resources of a PUSCH (e.g., a uPUSCH) allocated to a contention-based PUSCH (e.g., a contention-based uPUSCH).

The contention-based SR reception manager 835-*a* may be used to receive (e.g., in cooperation with a receiver), from a UE, a SR transmission. The SR transmission may be received in a radio frequency spectrum band on at least one resource of the contention-based PUSCH. In some examples, the SR transmission may include a reference signal, a user-specific RNTI, and/or BSR information.

The uplink resource manager 840-*a* may be used to determine an availability of uplink resources allocable to the UE.

The SR response selector 845-*a* may be used to select to transmit an uplink grant based at least in part on a determination (e.g., by the uplink resource manager 840-*a*) that uplink resources are available for allocation to the UE. The SR response selector 845-*a* may also be used to select to transmit an acknowledgement of the SR transmission based at least in part on a determination (e.g., by the uplink resource manager 840-*a*) that uplink resources are not available for allocation to the UE.

The SR response transmission manager 850-*a* may include an uplink grant transmission manager 940 or a SR acknowledgement transmission manager 945. The uplink grant transmission manager 940 may be used to transmit (e.g., in cooperation with a transmitter) in the radio frequency spectrum band, to the UE, the uplink grant. The SR acknowledgement transmission manager 945 may be used to transmit (e.g., in cooperation with a transmitter) in the radio frequency spectrum band, to the UE, the acknowledgement of the SR transmission. The SR acknowledgement transmission manager 945 may include a uPHICH ACK transmission manager 950, a PHICH ACK transmission manager 955, or a uPDCCH ACK transmission manager 960. The uPHICH ACK transmission manager 950 or the PHICH ACK transmission manager 955 may be used to transmit the acknowledgement of the SR transmission on a PHICH (e.g., on a uPHICH or legacy PHICH). In some examples, the uPHICH ACK transmission manager 950 may transmit the acknowledgement of the SR transmission on a resource of the PHICH having a fixed mapping to the at least one resource of the contention-based PUSCH. The uPDCCH ACK transmission manager 960 may be used to transmit the acknowledgement of the SR transmission in a group acknowledgement on a PDCCH (e.g., a uPDCCH).

Figure 10:
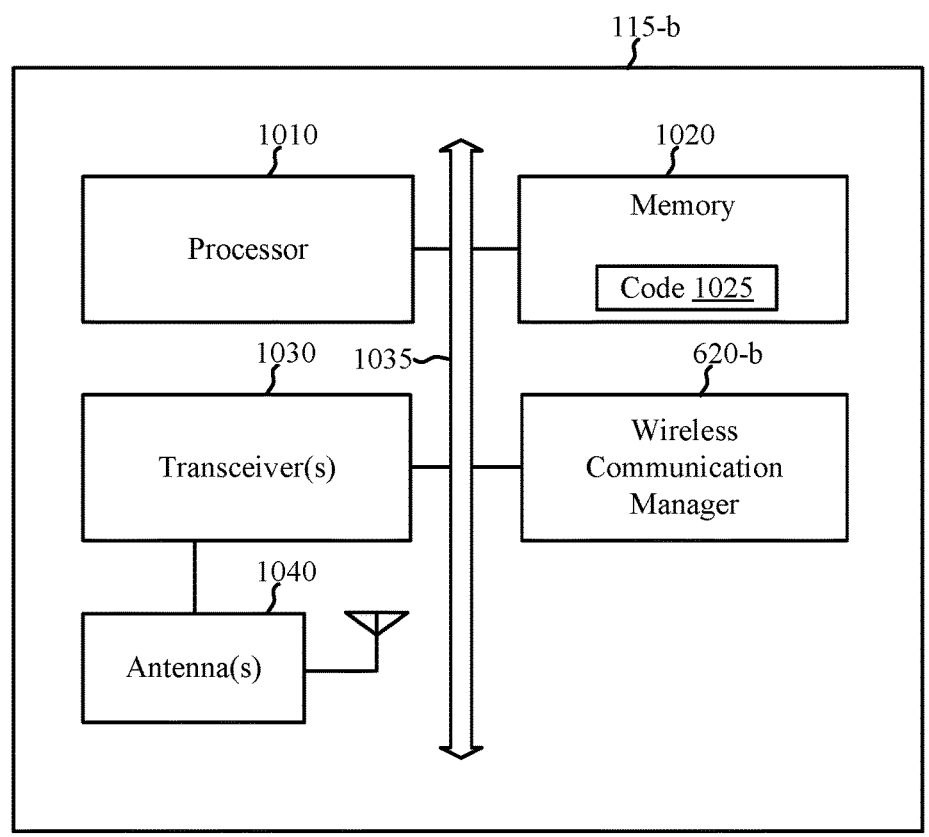
FIG. 10 shows a block diagram of a UE for use in wireless communication, in accordance with various aspects of the present disclosure.

FIG. 10 shows a block diagram 1000 of a UE 115-*b* for use in wireless communication, in accordance with various aspects of the present disclosure. The UE 115-*b* may be included or be part of a personal computer (e.g., a laptop computer, a netbook computer, a tablet computer, etc.), a cellular telephone, a PDA, a DVR, an internet appliance, a gaming console, an e-reader, etc. The UE 115-*b* may, in some examples, have an internal power supply (not shown), such as a small battery, to facilitate mobile operation. In some examples, the UE 115-*b* may be an example of aspects of one or more of the UEs 115 described with reference to FIG. 1 through 5, or aspects of the apparatus 615 described with reference to FIG. 6. The UE 115-*b* may be configured to implement at least some of the UE features and functions described with reference to FIG. 1, 2, 3, 4, 5, 6, or 7.

The UE 115-*b* may include a processor 1010, a memory 1020, at least one transceiver (represented by UE transceiver(s) 1030), at least one antenna (represented by antenna(s) 1040), or a wireless communication manager 620-*b*. Each of these components may be in communication with each other, directly or indirectly, over one or more buses 1035.

The memory 1020 may include random access memory (RAM) or read-only memory (ROM). The memory 1020 may store computer-readable, computer-executable code 1025 containing instructions that are operable, when executed, to cause the processor 1010 to perform various functions described herein related to wireless communication, including, for example, transmitting a SR transmission in a radio frequency spectrum band on at least one resource of a contention-based PUSCH (e.g., a uPUSCH), and monitoring the radio frequency spectrum band for a response to the SR transmission. Alternatively, the computer-executable code 1025 may not be directly executable by the processor 1010 but be configured to cause the UE 115-*b* (e.g., when compiled and executed) to perform various functions described herein.

The processor 1010 may include an intelligent hardware device, e.g., a central processing unit (CPU), a microcontroller, an ASIC, etc. The processor 1010 may process information received through the transceiver(s) 1030 or information to be sent to the transceiver(s) 1030 for transmission through the antenna(s) 1040. The processor 1010 may handle, alone or in connection with the wireless communication manager 620-*b*, various aspects of communicating over (or managing communications over) one or more radio frequency spectrum bands.

The transceiver(s) 1030 may include a modem configured to modulate packets and provide the modulated packets to the antenna(s) 1040 for transmission, and to demodulate packets received from the antenna(s) 1040. The transceiver(s) 1030 may, in some examples, be implemented as one or more transmitters and one or more separate receivers. The transceiver(s) 1030 may support communications over one or more wireless communication links. The transceiver(s) 1030 may be configured to communicate bi-directionally, via the antenna(s) 1040, with one or more network access devices or other apparatuses, such as one or more of the network access devices 105 described with reference to FIG. 1 or 3, or the apparatus 805 described with reference to FIG. 8. While the UE 115-*b* may include a single antenna, there may be examples in which the UE 115-*b* may include multiple antennas.

The wireless communication manager 620-*b* may be configured to perform or control some or all of the UE features or functions described with reference to FIG. 1, 2, 3, 4, 5, 6, or 7. The wireless communication manager 620-*b*, or portions thereof, may include a processor, or some or all of the functions of the wireless communication manager 620-*b* may be performed by the processor 1010 or in connection with the processor 1010. In some examples, the wireless communication manager 620-*b* may be an example of the wireless communication manager 620 described with reference to FIG. 6 or 7.

Figure 11:
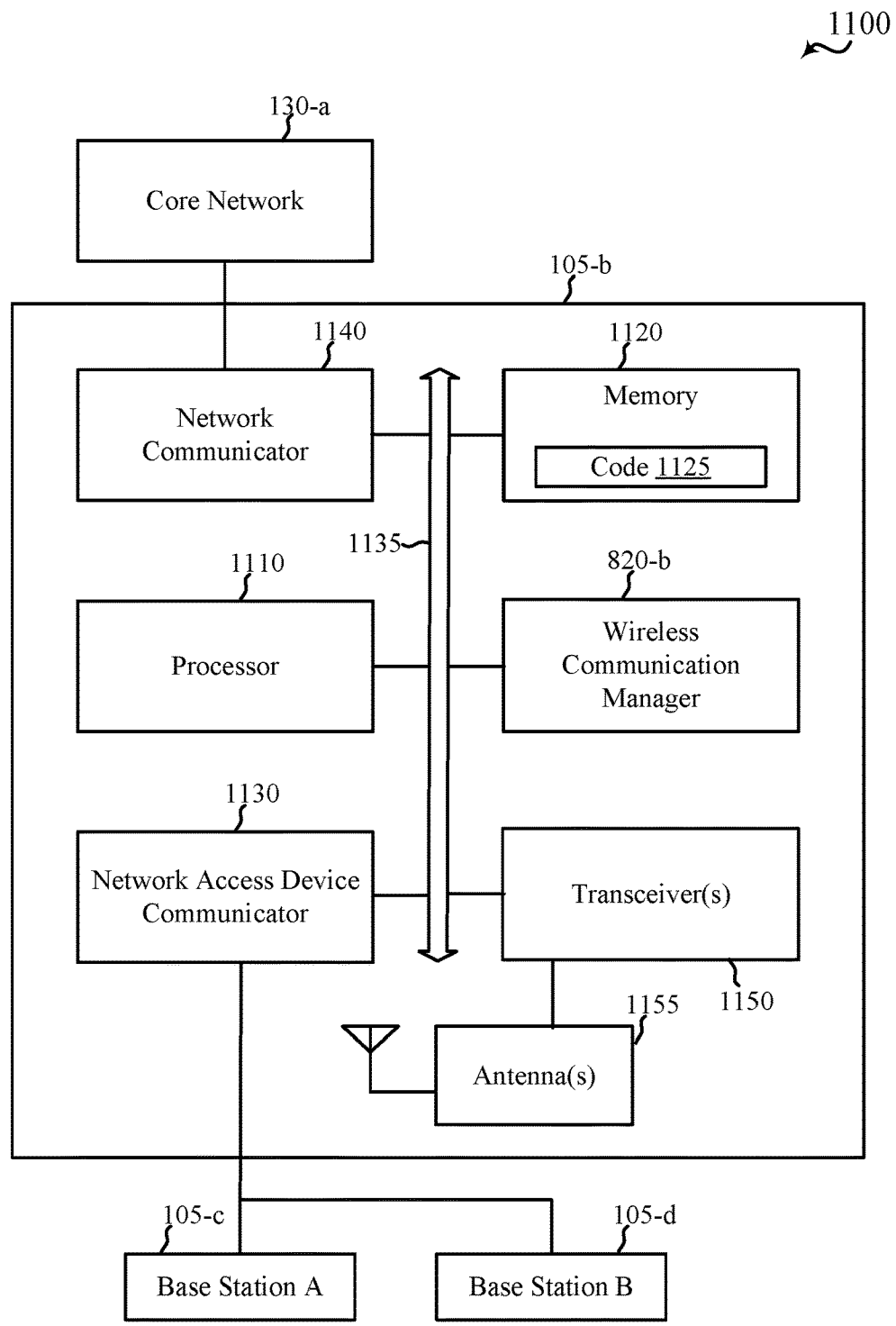
FIG. 11 shows a block diagram of a network access device for use in wireless communication, in accordance with various aspects of the present disclosure.

FIG. 11 shows a block diagram 1100 of a network access device 105-*b* (e.g., a base station forming part or all of an eNB) for use in wireless communication, in accordance with various aspects of the present disclosure. In some examples, the network access device 105-*b* may be an example of aspects of one or more of the network access devices 105 described with reference to FIG. 1 through 5, or aspects of the apparatus 805 described with reference to FIG. 8. The network access device 105-*b* may be configured to implement or facilitate at least some of the network access device features and functions described with reference to FIG. 1, 2, 3, 4, 5, 8, or 9.

The network access device 105-*b* may include a processor 1110, a memory 1120, at least one transceiver (represented by transceiver(s) 1150), at least one antenna (represented by antenna(s) 1155), or a wireless communication manager 820-*b*. The network access device 105-*b* may also include one or more of a network access device communicator 1130 or a network communicator 1140. Each of these components may be in communication with each other, directly or indirectly, over one or more buses 1135.

The memory 1120 may include RAM or ROM. The memory 1120 may store computer-readable, computer-executable code 1125 containing instructions that are operable, when executed, to cause the processor 1110 to perform various functions described herein related to wireless communication, including, for example, receiving from a UE a SR transmission in a radio frequency spectrum band on at least one resource of a contention-based PUSCH (e.g., a uPUSCH), determining an availability of uplink resources allocable to the UE, selecting a response to the SR transmission based at least in part on the determined availability of uplink resources allocable to the UE, and transmitting the selected response to the UE in the radio frequency spectrum band. Alternatively, the computer-executable code 1125 may not be directly executable by the processor 1110 but be configured to cause the network access device 105-*b* (e.g., when compiled and executed) to perform various functions described herein.

The processor 1110 may include an intelligent hardware device, e.g., a CPU, a microcontroller, an ASIC, etc. The processor 1110 may process information received through the transceiver(s) 1150, the network access device communicator 1130, or the network communicator 1140. The processor 1110 may also process information to be sent to the transceiver(s) 1150 for transmission through the antenna(s) 1155, to the network access device communicator 1130, for transmission to one or more other network access devices (e.g., the network access device 105-*c* or the network access device 105-*d*), or to the network communicator 1140 for transmission to a core network 130-*a*, which may be an example of one or more aspects of the core network 130 described with reference to FIG. 1. The processor 1110 may handle, alone or in connection with the wireless communication manager 820-*b*, various aspects of communicating over (or managing communications over) one or more radio frequency spectrum bands.

The transceiver(s) 1150 may include a modem configured to modulate packets and provide the modulated packets to the antenna(s) 1155 for transmission, and to demodulate packets received from the antenna(s) 1155. The transceiver (s) 1150 may, in some examples, be implemented as one or more transmitters and one or more separate receivers. The transceiver(s) 1150 may support communication over one or more wireless communication links. The transceiver(s) 1150 may be configured to communicate bi-directionally, via the antenna(s) 1155, with one or more UEs or other apparatuses, such as one or more of the UEs 115 described with reference to FIG. 1, 3, or 10, or the apparatus 615, described with reference to FIG. 6. The network access device 105-*b* may, for example, include multiple network access device antennas (e.g., an antenna array). The network access device 105-*b* may communicate with the core network 130-*a* through the network communicator 1140. The network access device 105-*b* may also communicate with other network access devices, such as the network access device 105-*c* or the network access device 105-*d*, using the network access device communicator 1130.

The wireless communication manager 820-*b* may be configured to perform or control some or all of the network access device or base station features or functions described with reference to FIG. 1, 2, 3, 4, 5, 8, or 9. The wireless communication manager 820-*b*, or portions thereof, may include a processor, or some or all of the functions of the wireless communication manager 820-*b* may be performed by the processor 1110 or in connection with the processor 1110. In some examples, the wireless communication manager 820-*b* may be an example of the wireless communication manager 820 described with reference to FIG. 8 or 9.

Figure 12:
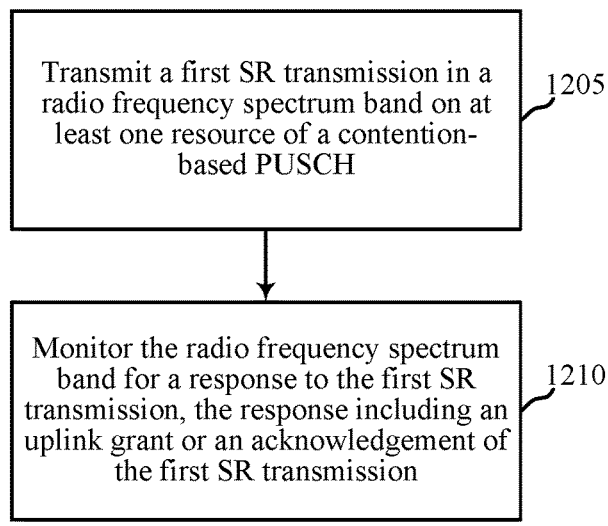
FIG. 12 is a flow chart illustrating an example of a method for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to a UE including aspects of one or more of the UEs 115 described with reference to FIG. 1-5, or 10, or aspects of one or more of the apparatuses 615 described with reference to FIG. 6 or 7. In some examples, a UE may execute one or more instructions to control the functional elements of the UE to perform the functions described below. Additionally or alternatively, the UE may perform one or more of the functions described below using special-purpose hardware.

At block 1205, the UE may transmit a first SR transmission in a radio frequency spectrum band on at least one resource of a contention-based PUSCH (e.g., a contention-based uPUSCH). In some examples, the at least one resource of the contention-based PUSCH may be randomly selected, and a cyclic shift may also be randomly selected. In these examples, the first SR transmission may be transmitted in the radio frequency spectrum band, on the randomly selected resource(s) of the contention-based PUSCH, using the randomly selected cyclic shift. In some examples, the SR transmission may include a reference signal, a user-specific RNTI, and/or BSR information. The operation(s) of block 1205 may be performed using a wireless communication manager 620 as described with reference to FIG. 6, 7, or 10, or a contention-based SR transmission manager 635 as described with reference to FIG. 6 or 7, which may operate in cooperation with a transmitter 630 as described with reference to FIG. 6, or antenna(s) 1040 and transceiver(s) 1030 as described with reference to FIG. 10.

At block 1210, the UE may monitor the radio frequency spectrum band for a response to the first SR transmission. The response may include an uplink grant or an acknowledgement of the first SR transmission. The operation(s) of block 1210 may be performed using a wireless communication manager 620 as described with reference to FIG. 6, 7, or 10, or a SR response monitor 640 as described with reference to FIG. 6 or 7, which may operate in cooperation with a receiver 610 as described with reference to FIG. 6, or antenna(s) 1040 and transceiver(s) 1030 as described with reference to FIG. 10.

Figure 13:
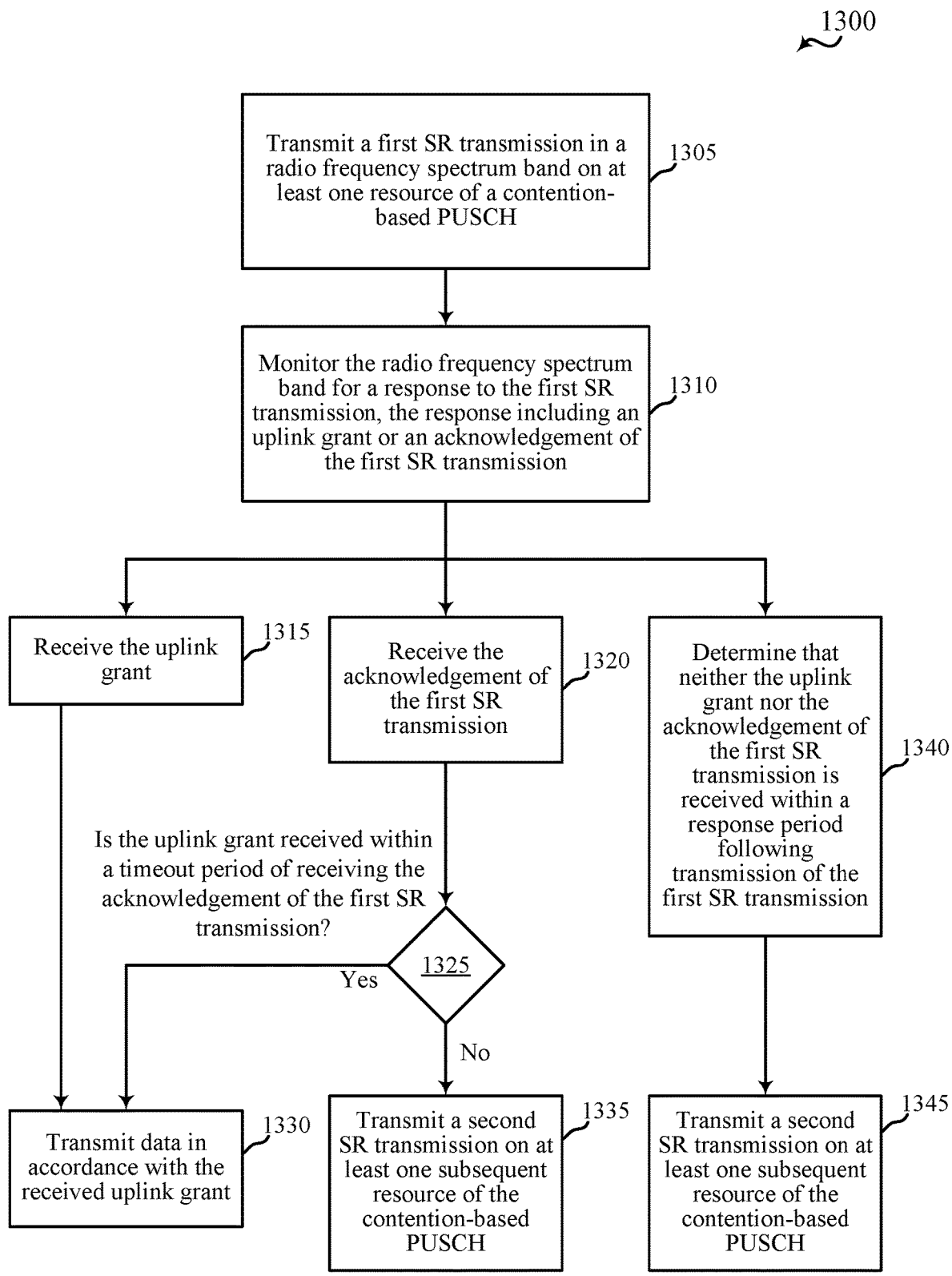
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to a UE including aspects of one or more of the UEs 115 described with reference to FIG. 1-5, or 10, or aspects of one or more of the apparatuses 615 described with reference to FIG. 6 or 7. In some examples, a UE may execute one or more instructions to control the functional elements of the UE to perform the functions described below. Additionally or alternatively, the UE may perform one or more of the functions described below using special-purpose hardware.

At block 1305, the UE may transmit a first SR transmission in a radio frequency spectrum band on at least one resource of a contention-based PUSCH (e.g., a contention-based uPUSCH). In some examples, the at least one resource of the contention-based PUSCH may be randomly selected, and a cyclic shift may also be randomly selected. In these examples, the first SR transmission may be transmitted in the radio frequency spectrum band, on the randomly selected resource(s) of the contention-based PUSCH, using the randomly selected cyclic shift. In some examples, the UE may receive an indication of a subset of resources of a PUSCH (e.g., a uPUSCH) allocated to the contention-based PUSCH, and may select, from the subset of resources, the at least one resource of the contention-based PUSCH used to transmit the first SR transmission. In some examples, the first SR transmission may include a reference signal, a user-specific RNTI, and/or BSR information. The operation(s) of block 1305 may be performed using a wireless communication manager 620 as described with reference to FIG. 6, 7, or 10, a contention-based SR transmission manager 635 as described with reference to FIG. 6 or 7, or a uPUSCH resource selector 735 as described with reference to FIG. 7, which may operate in cooperation with a transmitter 630 described with reference to FIG. 6, or antenna(s) 1040 and transceiver(s) 1030 as described with reference to FIG. 10.

At block 1310, the UE may monitor the radio frequency spectrum band for a response to the first SR transmission. The response may include an uplink grant or an acknowledgement of the first SR transmission. The operation(s) of block 1310 may be performed using a wireless communication manager 620 as described with reference to FIG. 6, 7, or 10, or a SR response monitor 640 as described with reference to FIG. 6 or 7, which may operate in cooperation with receiver 610 as described with reference to FIG. 6, or antenna(s) 1040 and transceiver(s) 1030 as described with reference to FIG. 10. Following block 1310, and depending on the result of the monitoring at block 1310, the method 1300 may continue at one of blocks 1315, 1320, or 1340.

At block 1315, the UE may receive the uplink grant. The operation(s) of block 1315 may be performed using a wireless communication manager 620 as described with reference to FIG. 6, 7, or 10, or an uplink transmission manager 740 as described with reference to FIG. 7, which may operate in cooperation with a receiver 610 as described with reference to FIG. 6, or antenna(s) 1040 and transceiver(s) 1030 as described with reference to FIG. 10.

Subsequently, at block 1330, the UE may transmit data in accordance with the received uplink grant. The operation(s) at block 1330 may be performed using a wireless communication manager 620 as described with reference to FIG. 6, 7, or 10, or an uplink transmission manager 740 as described with reference to FIG. 7, which may operate in cooperation with a transmitter 630 as described with reference to FIG. 6, or antenna(s) 1040 and transceiver(s) 1030 as described with reference to FIG. 10.

At block 1320, the UE may receive the acknowledgement of the first SR transmission. The operation(s) of block 1320 may be performed using a wireless communication manager 620 as described with reference to FIG. 6, 7, or 10, or a SR acknowledgement manager 745 as described with reference to FIG. 7, which may operate in cooperation with a receiver 610 as described with reference to FIG. 6, or antenna(s) 1040 and transceiver(s) 1030 as described with reference to FIG. 10.

At block 1325, the UE may determine that the uplink grant is received within a timeout period of receiving the acknowledgement of the first SR transmission. Upon determining the uplink grant is received within the timeout period, the method 1300 may continue at block 1330. Upon determining the uplink grant is not received within the timeout period, the method 1300 may continue at block 1335. The operation(s) of block 1325 may be performed using a wireless communication manager 620 as described with reference to FIG. 6, 7, or 10, or a SR acknowledgement manager 745 as described with reference to FIG. 7.

At block 1330, the UE may transmit data in accordance with the received uplink grant. The operation(s) of block 1330 may be performed using a wireless communication manager 620 as described with reference to FIG. 6, 7, or 10, or an uplink transmission manager 740 as described with reference to FIG. 7, which may operate in cooperation with a transmitter 630 as described with reference to FIG. 6, or antenna(s) 1040 and transceiver(s) 1030 as described with reference to FIG. 10.

At block 1335, the UE may transmit a second SR transmission on at least one subsequent resource of the contention-based PUSCH based at least in part on the determination that the uplink grant is not received within the timeout period. The operation(s) of block 1335 may be performed using a wireless communication manager 620 as described with reference to FIG. 6, 7, or 10, or a contention-based SR transmission manager 635 as described with reference to FIG. 6 or 7, which may operate in cooperation with a transmitter 630 as described with reference to FIG. 6, or antenna(s) 1040 and transceiver(s) 1030 as described with reference to FIG. 10.

At block 1340, the UE may determine that neither the uplink grant nor the acknowledgement of the first SR transmission is received within a response period following transmission of the first SR transmission. The operation(s) of block 1340 may be performed using a wireless communication manager 620 as described with reference to FIG. 6, 7, or 10, or a SR response monitor 640 as described with reference to FIG. 6 or 7.

At block 1345, the UE may transmit a second SR transmission on the contention-based PUSCH based at least in part on the determination that neither the uplink grant nor the acknowledgement of the first SR transmission is received within the response period. In some examples, the UE may generate a random backoff time period and transmitting the second SR transmission after expiration of the random backoff time period. The operation(s) of block 1345 may be performed using a wireless communication manager 620 as described with reference to FIG. 6, 7, or 10, or a spectrum contention manager 750 as described with reference to FIG. 7, which may operate in cooperation with a transmitter 630 as described with reference to FIG. 6, or antenna(s) 1040 and transceiver(s) 1030 as described with reference to FIG. 10.

In some examples of the method 1300, the monitoring at block 1310 may include monitoring a PHICH (e.g., a uPHICH) for the acknowledgement of the first SR transmission. In some examples, the PHICH may be monitored using the uPHICH monitor 755 described with reference to FIG. 7. In some examples, monitoring the PHICH may include monitoring a resource of the PHICH according to a resource mapping relative to the at least one resource of the contention-based PUSCH (e.g., a fixed number of TTIs after the at least one resource on which the first SR transmission is transmitted at block 1305). In some examples, the method 1300 may include selecting a first TTI for transmitting the first SR transmission based at least in part on a relationship of the first TTI to a second TTI in which the PHICH to be monitored is scheduled. In some examples, the first SR transmission may be transmitted during a first TTI, and the PHICH may be monitored during a second TTI occurring at least a predetermined time after the first TTI.

In some examples of the method 1300, the monitoring at block 1310 may include monitoring a PHICH (e.g., a legacy PHICH) for the acknowledgement of the first SR transmission. In some examples, the PHICH may be monitored using the PHICH monitor 760 described with reference to FIG. 7. In some of these examples, the method 1300 may include receiving an indication of a subset of resources of the contention-based PUSCH available to the UE (e.g., the UE performing the method 1300), and selecting, from the subset of resources of the contention-based PUSCH, the at least one resource of the contention-based PUSCH used to transmit the first SR transmission at block 1305.

In some examples of the method 1300, the monitoring at block 1310 may include monitoring a PDCCH (e.g., a uPDCCH) for a group acknowledgement indicating the acknowledgement of the first SR transmission. In some examples, the PDCCH may be monitored using the uPDCCH monitor 765 described with reference to FIG. 7. In some examples, the method 1300 may include receiving an indication of a subset of resources of the contention-based PUSCH associated with a measured signal characteristic of the UE (e.g., a measured signal characteristic of a transmission to or from the UE performing the method 1300), and selecting, from the subset of resources of the contention-based PUSCH, the at least one resource of the contention-based PUSCH used to transmit the first SR transmission. In some examples, the acknowledgement of the first SR transmission may be received at a transmit power matched to the measured signal characteristic associated with the UE.

Figure 14:
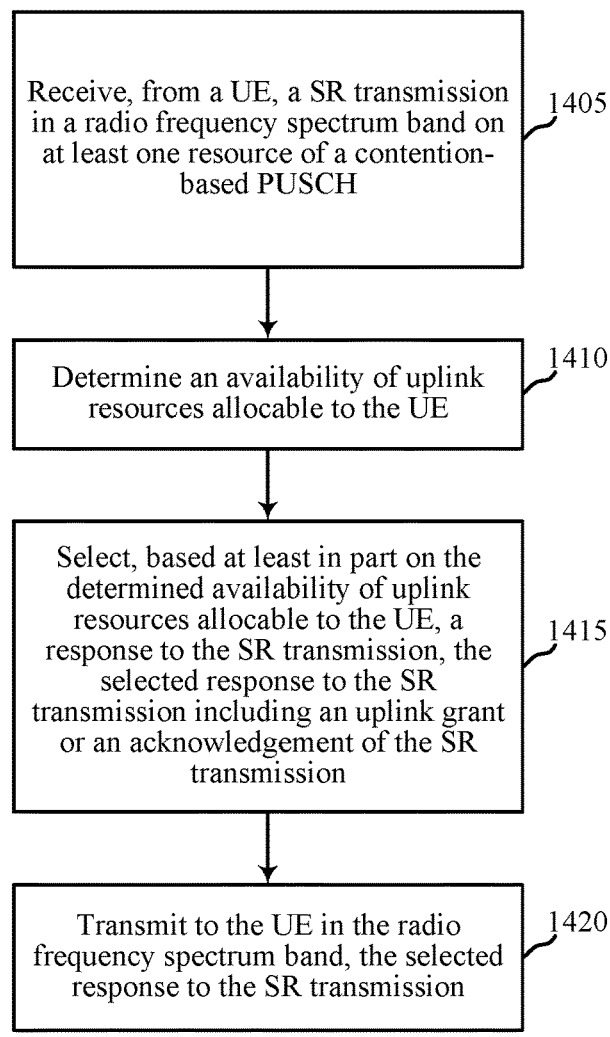
FIG. 14 is a flow chart illustrating an example of a method for wireless communication at a network access device, in accordance with various aspects of the present disclosure.

FIG. 14 is a flow chart illustrating an example of a method 1400 for wireless communication at a network access device, in accordance with various aspects of the present disclosure. For clarity, the method 1400 is described below with reference to a network access device including aspects of one or more of the network access devices 105 described with reference to FIG. 1-5 or 11, or aspects of one or more of the apparatuses 805 described with reference to FIG. 8 or 9. In some examples, a network access device may execute one or more instructions to control the functional elements of the network access device to perform the functions described below. Additionally or alternatively, the network access device may perform one or more of the functions described below using special-purpose hardware.

At block 1405, a network access device may receive, from a UE, a SR transmission. The SR transmission may be received in a radio frequency spectrum band on at least one resource of a contention-based PUSCH (e.g., a contention-based uPUSCH). In some examples, the SR transmission may include a reference signal, a user-specific RNTI, and/or BSR information. The operation(s) at block 1405 may be performed using a wireless communication manager 820 as described with reference to FIG. 8, 9, or 11, or a contention-based SR reception manager 835 as described with reference to FIG. 8 or 9, which may operate in cooperation with a receiver 810 as described with reference to FIG. 8, or antenna(s) 1155 and transceiver(s) 1150 as described with reference to FIG. 11.

At block 1410, the network access device may determine an availability of uplink resources allocable to the UE. The operation(s) at block 1410 may be performed using a wireless communication manager 820 as described with reference to FIG. 8, 9, or 11, or an uplink resource manager 840 as described with reference to FIG. 8 or 9.

At block 1415, the network access device may select, based at least in part on the determined availability of uplink resources allocable to the UE, a response to the SR transmission. The selected response to the SR transmission may include an uplink grant or an acknowledgement of the SR transmission. The operation(s) at block 1415 may be performed using a wireless communication manager 820 as described with reference to FIG. 8, 9, or 11, or a SR response selector 845 as described with reference to FIG. 8 or 9.

At block 1420, the network access device may transmit, to the UE in the radio frequency spectrum band, the selected response to the SR transmission. The operation(s) at block 1420 may be performed using a wireless communication manager 820 as described with reference to FIG. 8, 9, or 11, a SR response transmission manager 850 as described with reference to FIG. 8 or 9, or an uplink grant transmission manager 940 or SR acknowledgement transmission manager 945 as described with reference to FIG. 9, which may operate in cooperation with a transmitter 630 as described with reference to FIG. 8, or antenna(s) 1155 and transceiver(s) 1150 as described with reference to FIG. 11.

Figure 15:
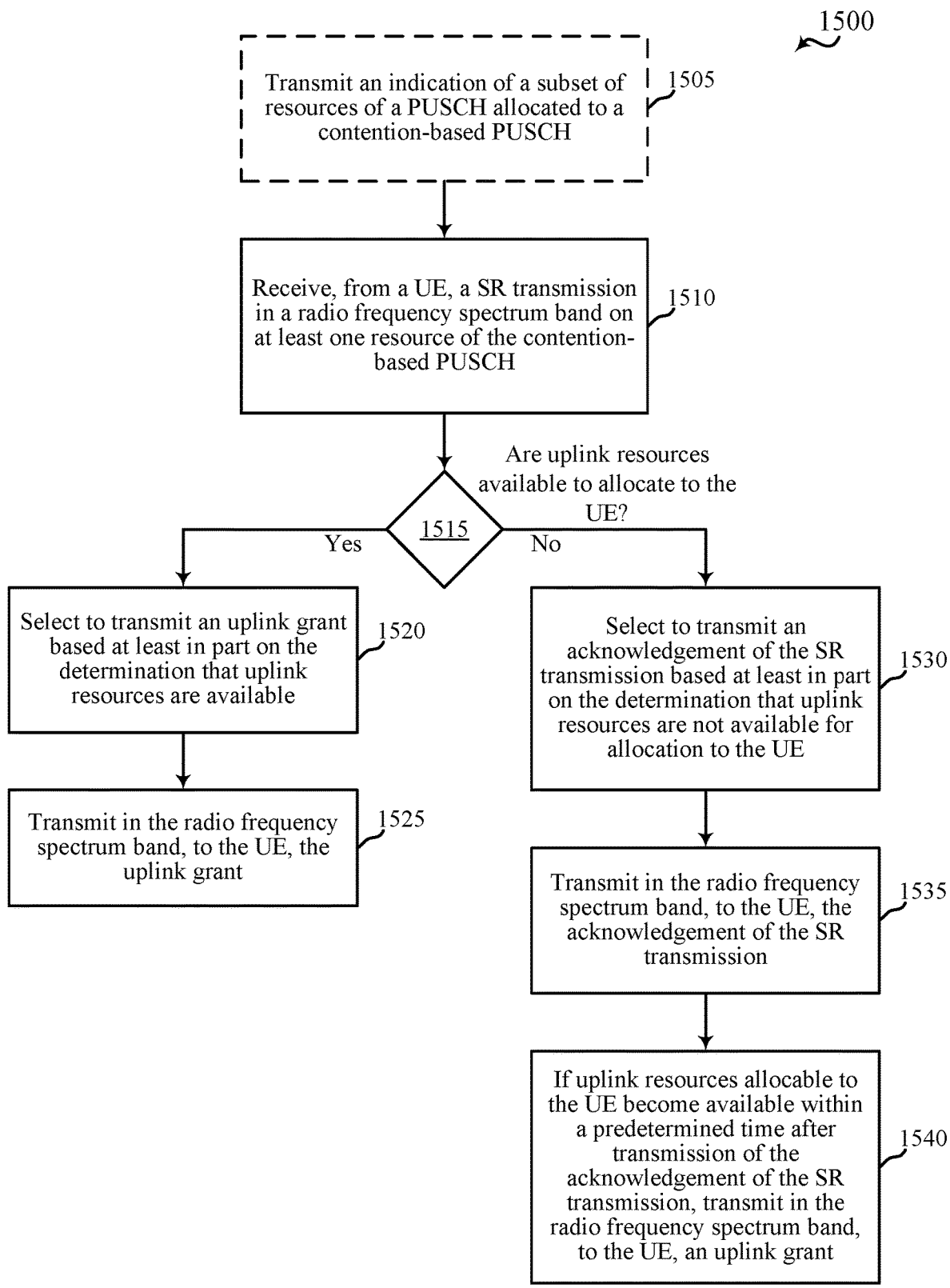
FIG. 15 is a flow chart illustrating an example of a method for wireless communication at a network access device, in accordance with various aspects of the present disclosure.

FIG. 15 is a flow chart illustrating an example of a method 1500 for wireless communication at a network access device, in accordance with various aspects of the present disclosure. For clarity, the method 1500 is described below with reference to a network access device including aspects of one or more of the network access devices 105 described with reference to FIG. 1-5 or 11, or aspects of one or more of the apparatuses 805 described with reference to FIG. 8 or 9. In some examples, a network access device may execute one or more instructions to control the functional elements of the network access device to perform the functions described below. Additionally or alternatively, the network access device may perform one or more of the functions described below using special-purpose hardware.

At block 1505, a network access device may optionally transmit an indication of a subset of resources of a PUSCH (e.g., a uPUSCH) that are allocated to a contention-based PUSCH (e.g., a contention based uPUSCH). The operation(s) at block 1505 may be performed using a wireless communication manager 820 as described with reference to FIG. 8, 9, or 11, or a contention-based PUSCH resource allocator 935 as described with reference to FIG. 9, which may operate in cooperation with a transmitter 830 as described with reference to FIG. 8, or antenna(s) 1155 and transceiver(s) 1150 as described with reference to FIG. 11.

At block 1510, the network access device may receive, from a UE, a SR transmission. The SR transmission may be received in a radio frequency spectrum band on at least one resource of the contention-based PUSCH. In some examples, the SR transmission may include a reference signal, a user-specific RNTI, and/or BSR information. The operation(s) at block 1510 may be performed using a wireless communication manager 820 as described with reference to FIG. 8, 9, or 11, or a contention-based SR reception manager 835 as described with reference to FIG. 8 or 9, which may operate in cooperation with a receiver 810 as described with reference to FIG. 8, or antenna(s) 1155 and transceiver(s) 1150 as described with reference to FIG. 11.

At block 1515, the network access device may determine an availability of uplink resources allocable to the UE. Upon determining uplink resources are available, the method 1500 may continue at block 1520. Upon determining uplink resources are not available, the method 1500 may continue at block 1530. The operation(s) at block 1515 may be performed using a wireless communication manager 820 as described with reference to FIG. 8, 9, or 11, or an uplink resource manager 840 as described with reference to FIG. 8 or 9.

At block 1520, the network access device may select to transmit an uplink grant based at least in part on a determination that uplink resources are available for allocation to the UE. The operation(s) at block 1520 may be performed using a wireless communication manager 820 as described with reference to FIG. 8, 9, or 11, or a SR response selector 845 as described with reference to FIG. 8 or 9.

At block 1525, the network access device may transmit, to the UE in the radio frequency spectrum band, the uplink grant. The operation(s) at block 1525 may be performed using a wireless communication manager 820 as described with reference to FIG. 8, 9, or 11, a SR response transmission manager 850 as described with reference to FIG. 8 or 9, or an uplink grant transmission manager 940 as described with reference to FIG. 9, which may operate in cooperation with a transmitter 830 as described with reference to FIG. 8, or antenna(s) 1155 and transceiver(s) 1150 as described with reference to FIG. 11.

At block 1530, the network access device may select to transmit an acknowledgement of the SR transmission based at least in part on a determination that uplink resources are not available for allocation to the UE. The operation(s) at block 1530 may be performed using a wireless communication manager 820 as described with reference to FIG. 8, 9, or 11, or a SR response selector 845 as described with reference to FIG. 8 or 9.

At block 1535, the network access device may transmit, to the UE in the radio frequency spectrum band, the acknowledgement of the SR transmission. The operation(s) at block 1535 may be performed using a wireless communication manager 820 as described with reference to FIG. 8, 9, or 11, a SR response transmission manager 850 as described with reference to FIG. 8 or 9, or a SR acknowledgement transmission manager 945 as described with reference to FIG. 9, which may operate in cooperation with a transmitter 830 as described with reference to FIG. 8, or antenna(s) 1155 and transceiver(s) 1150 as described with reference to FIG. 11.

At block 1540, the network access device may transmit an uplink grant to the UE if uplink resources allocable to the UE become available within a predetermined time after transmission of the acknowledgement of the SR transmission (e.g., within a timeout period). The operation(s) at block 1540 may be performed using a wireless communication manager 820 as described with reference to FIG. 8, 9, or 11, a SR response transmission manager 850 as described with reference to FIG. 8 or 9, or an uplink grant transmission manager 940 as described with reference to FIG. 9, which may operate in cooperation with a transmitter 830 as described with reference to FIG. 8, or antenna(s) 1155 and transceiver(s) 1150 as described with reference to FIG. 11.

In some examples of the method 1500, the acknowledgement of the SR transmission may be transmitted on a PHICH (e.g., on a uPHICH or legacy PHICH). In some examples, the acknowledgement of the SR transmission may be transmitted using the uPHICH ACK transmission manager 950 or PHICH ACK transmission manager 955 described with reference to FIG. 9. In some examples, the acknowledgement of the SR transmission may be transmitted on a resource of the PHICH having a resource mapping relative to the at least one resource of the contention-based PUSCH (e.g., a fixed number of TTIs after the at least one resource of the contention-based PUSCH).

In some examples of the method 1500, the acknowledgement of the SR transmission may be transmitted in a group acknowledgement on a PDCCH (e.g., on a uPDCCH). In some examples, the acknowledgement of the SR transmission may be transmitted using the uPDCCH ACK transmission manager 960 described with reference to FIG. 9.

The methods 1200, 1300, 1400, and 1500 described with reference to FIGS. 12, 13, 14, and 15 describe possible implementations, and the operations of the methods may be rearranged or otherwise modified such that other implementations are possible.

Techniques described herein may be used for various wireless communication systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1X, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   determining a second transmission time interval (TTI) to monitor for a response to a first scheduling request (SR) transmission;
   selecting a first TTI for transmitting the first SR transmission based at least in part on the second TTI and a relationship of the first TTI to the second TTI;
   transmitting the first SR transmission in the first TTI and in a radio frequency spectrum band on at least one resource of a contention-based physical uplink shared channel (PUSCH); and
   monitoring the radio frequency spectrum band for the response to the first SR transmission, the response comprising one message selected from a set of messages that includes an uplink grant that indicates uplink resources allocable to the UE are available and an acknowledgement of the first SR transmission, wherein reception of the acknowledgement implicitly indicates uplink resources allocable to the UE are unavailable.

2. The method of claim 1, further comprising:
   randomly selecting the at least one resource of the contention-based PUSCH; and
   randomly selecting a cyclic shift;
   wherein the first SR transmission uses the randomly selected cyclic shift.

3. The method of claim 1, further comprising:
   receiving the one message selected from the set of messages, the one message comprising the acknowledgement of the first SR transmission that implicitly indicates uplink resources allocable to the UE are unavailable; and
   continuing the monitoring of the radio frequency spectrum band, based at least in part on receiving the acknowledgment, during a timeout period.

4. The method of claim 3, further comprising:
   determining that the uplink grant is not received within the timeout period of receiving the acknowledgement of the first SR transmission; and
   transmitting a second SR transmission on at least one subsequent resource of the contention-based PUSCH based at least in part on the determination.

5. The method of claim 1, wherein the monitoring comprises:
   monitoring a physical hybrid automatic repeat request indicator channel (PHICH) for the acknowledgement of the first SR transmission.

6. The method of claim 5, wherein the monitoring comprises:
   monitoring a resource of the PHICH according to a resource mapping relative to the at least one resource of the contention-based PUSCH.

7. The method of claim 5, wherein the first SR transmission is transmitted during a first TTI, and wherein the monitoring comprises:
   monitoring the PHICH during a second TTI occurring at least a predetermined time after the first TTI.

8. The method of claim 5, further comprising:
   receiving an indication of a subset of resources of the contention-based PUSCH available to the UE; and
   selecting, from the subset of resources of the contention-based PUSCH, the at least one resource of the contention-based PUSCH used to transmit the first SR transmission.

9. The method of claim 1, further comprising:
   receiving an indication of a subset of resources of a PUSCH allocated to the contention-based PUSCH; and
   selecting, from the subset of resources, the at least one resource of the contention-based PUSCH used to transmit the first SR transmission.

10. The method of claim 1, further comprising:
    determining that neither the uplink grant nor the acknowledgement of the first SR transmission is received within a response period following transmission of the first SR transmission; and
    transmitting a second SR transmission on the contention-based PUSCH based at least in part on the determination.

11. The method of claim 10, further comprising:
generating a random backoff time period;
wherein the second SR transmission is transmitted after expiration of the random backoff time period.

12. A method for wireless communication at a network access device, comprising:
receiving, from a user equipment (UE), a scheduling request (SR) transmission in a first transmission time interval (TTI) and in a radio frequency spectrum band on at least one resource of a contention-based physical uplink shared channel (PUSCH), the SR transmission received in the first TTI based at least in part on a relationship of the first TTI to a second TTI for responding to the SR transmission;
determining an availability of uplink resources allocable to the UE;
selecting, based at least in part on the determined availability of uplink resources allocable to the UE, a response to the SR transmission, the selected response to the SR transmission comprising one message selected from a set of messages that includes an uplink grant that indicates uplink resources allocable to the UE are available and an acknowledgement of the SR transmission, wherein a presence of the acknowledgement in the response implicitly indicates that uplink resources allocable to the UE are unavailable; and
transmitting, to the UE in the second TTI and in the radio frequency spectrum band, the selected response to the SR transmission.

13. The method of claim 12, wherein the selected response to the SR transmission comprises the acknowledgement of the SR transmission that implicitly indicates that uplink resources allocable to the UE are unavailable.

14. The method of claim 13, further comprising:
transmitting the acknowledgement of the SR transmission on a physical hybrid automatic repeat request indicator channel (PHICH).

15. The method of claim 14, wherein the acknowledgement of the SR transmission is transmitted on a resource of the PHICH having a resource mapping relative to the at least one resource of the contention-based PUSCH.

16. The method of claim 12, further comprising:
transmitting an indication of a subset of resources of a PUSCH that are allocated to the contention-based PUSCH.

17. An apparatus for wireless communication at a user equipment (UE), comprising:
a processor;
memory in electronic communication with the processor; and
instructions stored in the memory and operable, when executed by the processor, to cause the apparatus to:
determine a second transmission time interval (TTI) to monitor for a response to a first scheduling request (SR) transmission;
select a first TTI for transmitting the first SR transmission based at least in part on the second TTI and a relationship of the first TTI to the second TTI;
transmit the first SR transmission in the first TTI and in a radio frequency spectrum band on at least one resource of a contention-based physical uplink shared channel (PUSCH); and
monitor the radio frequency spectrum band for the response to the first SR transmission, the response comprising one message selected from a set of messages that includes an uplink grant that indicates uplink resources allocable to the UE are available and an acknowledgement of the first SR transmission, wherein reception of the acknowledgement implicitly indicates uplink resources allocable to the UE are unavailable.

18. The apparatus of claim 17, further comprising instructions operable to cause the apparatus to:
randomly select the at least one resource of the contention-based PUSCH; and
randomly select a cyclic shift;
wherein the first SR transmission uses the randomly selected cyclic shift.

19. The apparatus of claim 17, further comprising instructions operable to cause the apparatus to:
receive the one message selected from the set of messages, the one message comprising the acknowledgement of the first SR transmission that implicitly indicates uplink resources allocable to the UE are unavailable; and
continue to monitor the radio frequency spectrum band, based at least in part on receiving the acknowledgment, during a timeout period.

20. The apparatus of claim 19, further comprising instructions operable to cause the apparatus to:
determine that the uplink grant is not received within the timeout period of receiving the acknowledgement of the first SR transmission; and
transmit a second SR transmission on at least one subsequent resource of the contention-based PUSCH based at least in part on the determination.

21. The apparatus of claim 17, further comprising instructions operable to cause the apparatus to:
monitor a physical hybrid automatic repeat request indicator channel (PHICH) for the acknowledgement of the first SR transmission.

22. The apparatus of claim 17, further comprising instructions operable to cause the apparatus to:
receive an indication of a subset of resources of a PUSCH allocated to the contention-based PUSCH; and
select, from the subset of resources, the at least one resource of the contention-based PUSCH used to transmit the first SR transmission.

23. The apparatus of claim 17, further comprising instructions operable to cause the apparatus to:
determine that neither the uplink grant nor the acknowledgement of the first SR transmission is received within a response period following transmission of the first SR transmission; and
transmit a second SR transmission on the contention-based PUSCH based at least in part on the determination.

24. The apparatus of claim 23, further comprising instructions operable to cause the apparatus to:
generate a random backoff time period;
wherein the second SR transmission is transmitted after expiration of the random backoff time period.

25. An apparatus for wireless communication at a network access device, comprising:
a processor;
memory in electronic communication with the processor; and
instructions stored in the memory and operable, when executed by the processor, to cause the apparatus to:
receive, from a user equipment (UE), a scheduling request (SR) transmission in a first transmission time interval (TTI) and in a radio frequency spectrum band on at least one resource of a contention-based physical uplink shared channel (PUSCH), the SR transmission received in the first TTI based at least in part on a relationship of the first TTI to a second TTI for responding to the SR;

determine an availability of uplink resources allocable to the UE;

select, based at least in part on the determined availability of uplink resources allocable to the UE, a response to the SR transmission, the selected response to the SR transmission comprising one message selected from a set of messages that includes an uplink grant that indicates uplink resources allocable to the UE are available and an acknowledgement of the SR transmission, wherein a presence of the acknowledgement in the response implicitly indicates that uplink resources allocable to the UE are unavailable; and transmit, to the UE in the second TTI and in the radio frequency spectrum band, the selected response to the SR transmission.

26. The apparatus of claim 25, wherein the selected response to the SR transmission comprises the acknowledgement of the SR transmission that implicitly indicates that uplink resources allocable to the UE are unavailable.

27. The apparatus of claim 26, further comprising instructions operable to cause the apparatus to:

transmit the acknowledgement of the SR transmission on a physical hybrid automatic repeat request indicator channel (PHICH).

28. The apparatus of claim 27, wherein the acknowledgement of the SR transmission is transmitted on a resource of the PHICH having a resource mapping relative to the at least one resource of the contention-based PUSCH.

29. The apparatus of claim 25, further comprising instructions operable to cause the apparatus to:

transmit an indication of a subset of resources of a PUSCH that are allocated to the contention-based PUSCH.

* * * * *